United States Patent
Cruess et al.

(10) Patent No.: US 11,791,630 B1
(45) Date of Patent: Oct. 17, 2023

(54) MULTI-FUNCTIONAL BUILDING POWER MANAGEMENT

(71) Applicant: Zero Nox, Inc., Porterville, CA (US)

(72) Inventors: Robert Thomas Cruess, Porterville, CA (US); John Andrew Costanzo, Porterville, CA (US); Dale Chi-Don Chiu, Hsinchu (TW)

(73) Assignee: Zero Nox, Inc., Porterville, CA (US)

( * ) Notice: Subject to any disclaimer, the term of this patent is extended or adjusted under 35 U.S.C. 154(b) by 17 days.

(21) Appl. No.: 17/306,788

(22) Filed: May 3, 2021

Related U.S. Application Data

(60) Provisional application No. 63/019,164, filed on May 1, 2020.

(51) Int. Cl.
*H02J 3/14* (2006.01)
*H02J 3/00* (2006.01)

(52) U.S. Cl.
CPC ............... *H02J 3/14* (2013.01); *H02J 3/008* (2013.01); *H02J 2310/14* (2020.01)

(58) Field of Classification Search
None
See application file for complete search history.

(56) References Cited

U.S. PATENT DOCUMENTS

| | | | |
|---|---|---|---|
| 7,838,142 B2 | 11/2010 | Scheucher | |
| 8,725,306 B2 * | 5/2014 | Ramezani | B60L 53/63 700/297 |
| 8,860,250 B2 | 10/2014 | Salcone | |
| 8,872,379 B2 * | 10/2014 | Ruiz | G07F 15/008 307/66 |
| 9,096,141 B2 | 8/2015 | Soong et al. | |
| 9,559,521 B1 * | 1/2017 | King | H02J 7/34 |
| 9,586,497 B2 | 3/2017 | Epstein et al. | |
| 9,671,843 B2 * | 6/2017 | Ellis | H02J 3/381 |
| 10,630,094 B1 * | 4/2020 | Ardaman | H02J 7/007 |
| 2003/0201754 A1 * | 10/2003 | Conrad | A47L 9/2873 320/116 |
| 2010/0230292 A1 * | 9/2010 | Kelly | H01M 8/0656 205/637 |

(Continued)

FOREIGN PATENT DOCUMENTS

| CN | 104795881 B | * | 9/2017 | ................ H02J 7/35 |
| CN | 107785940 A | * | 3/2018 | ............ H02J 7/0063 |

(Continued)

*Primary Examiner* — Jason Lin
(74) *Attorney, Agent, or Firm* — Knobbe, Martens, Olson & Bear, LLP

(57) ABSTRACT

A building power management system is disclosed. The system includes a stationary energy storage device and a rechargeable, portable energy storage device. The stationary energy storage device includes a charging dock for receiving and charging the portable energy storage device. The stationary energy storage device can charge the portable energy storage device even when an electrical grid is unavailable. The portable energy storage device can provide power for other devices. Based at least in part on charge levels of the stationary energy storage device and the portable energy storage device, the power management system controls charging and discharging of the stationary energy storage device and the portable energy storage device.

27 Claims, 13 Drawing Sheets

(56) References Cited

U.S. PATENT DOCUMENTS

| | | |
|---|---|---|
| 2011/0204720 A1* | 8/2011 | Ruiz ................... B60L 53/305 307/66 |
| 2011/0304295 A1 | 12/2011 | McNally |
| 2012/0046798 A1* | 2/2012 | Orthlieb ............ H02J 13/00002 700/297 |
| 2012/0112697 A1* | 5/2012 | Heuer .................... B60L 53/30 320/109 |
| 2012/0303259 A1 | 11/2012 | Prosser |
| 2012/0323386 A1* | 12/2012 | Ito .......................... B60L 53/51 700/291 |
| 2013/0002032 A1* | 1/2013 | Mori ....................... H02J 3/382 307/84 |
| 2013/0221918 A1* | 8/2013 | Hill .......................... H02J 7/34 320/109 |
| 2014/0327405 A1 | 11/2014 | Carkner |
| 2018/0118174 A1 | 5/2018 | Moskowitz |
| 2018/0316136 A1* | 11/2018 | Cho ..................... H02J 7/0027 |
| 2019/0103641 A1 | 4/2019 | O'Hora |
| 2019/0160972 A1 | 5/2019 | Zeiler et al. |
| 2019/0168630 A1 | 6/2019 | Mrlik et al. |
| 2019/0359198 A1 | 11/2019 | Velderman et al. |
| 2020/0250693 A1* | 8/2020 | Kanamori ............... B60L 53/67 |
| 2020/0412147 A1* | 12/2020 | Mandel ................ H02J 7/0042 |

FOREIGN PATENT DOCUMENTS

| | | | |
|---|---|---|---|
| KR | 20140034132 A | * | 3/2014 |
| TW | 201726453 A | * | 8/2017 |
| WO | WO 2011/009543 A2 | | 1/2011 |

* cited by examiner

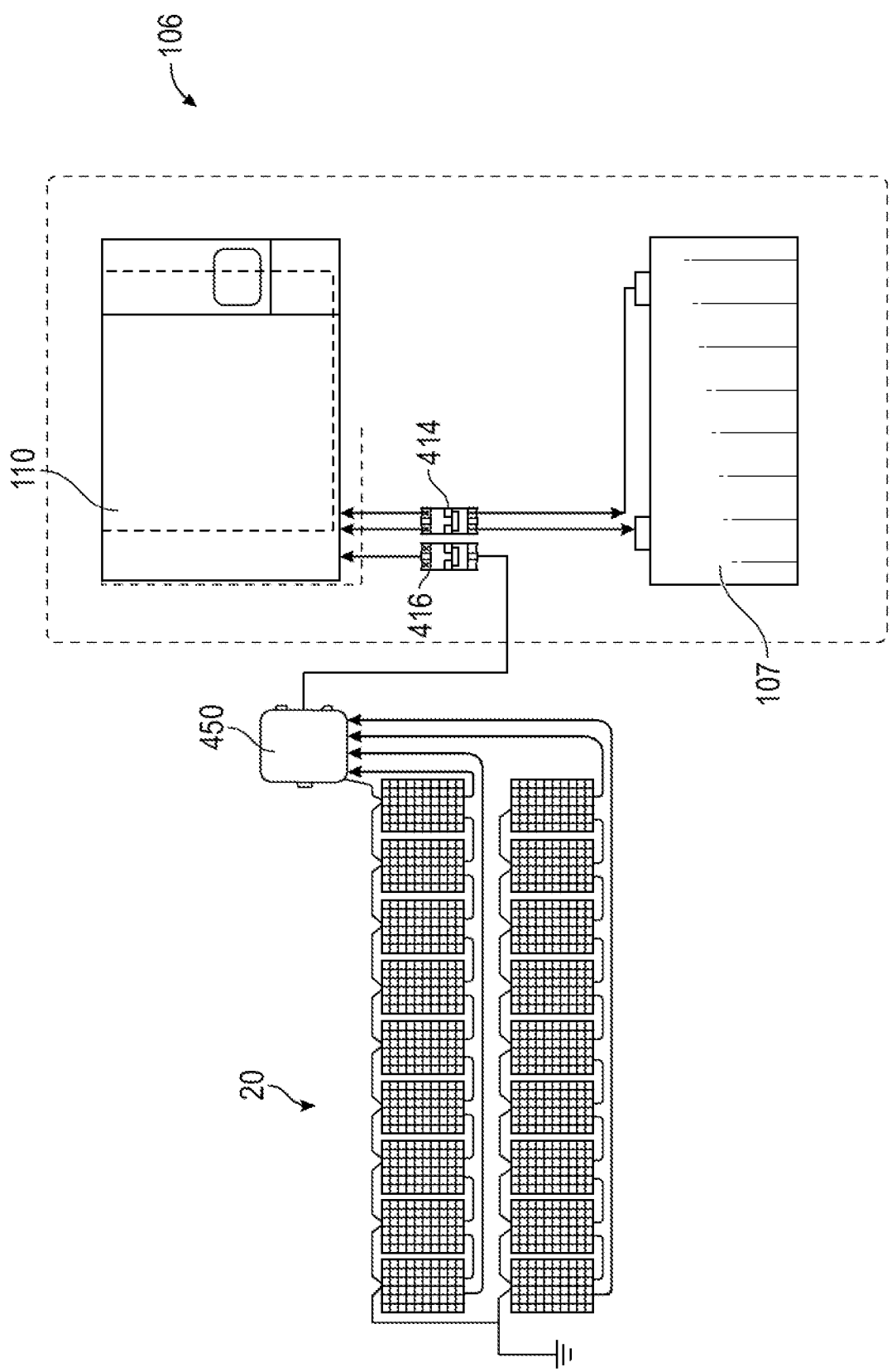

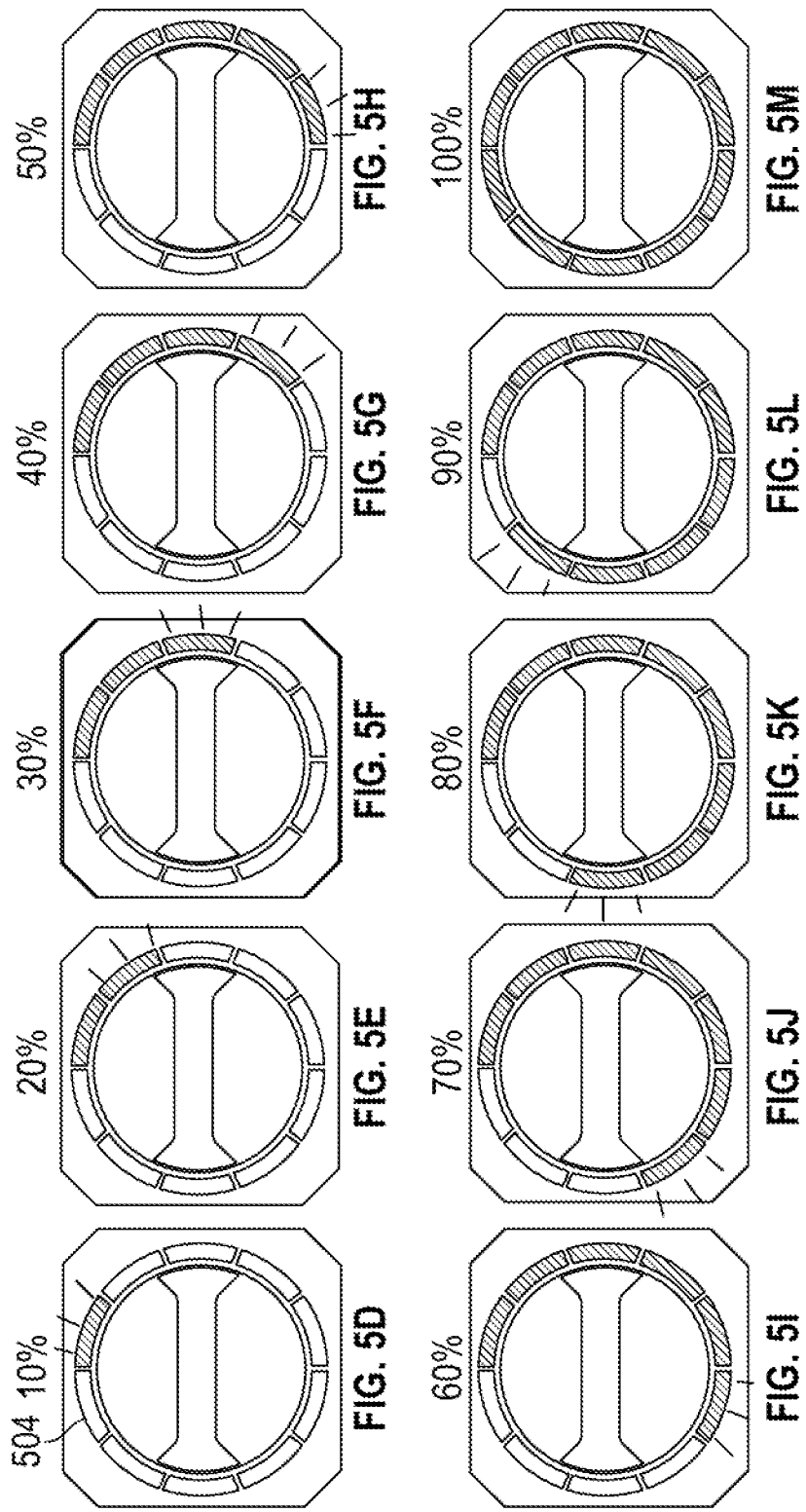

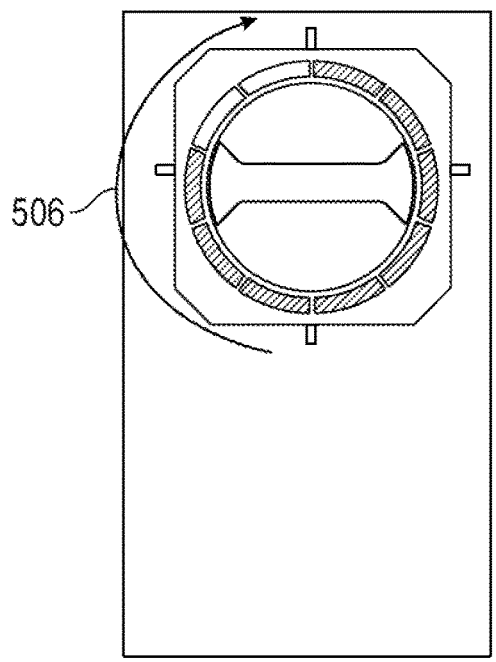 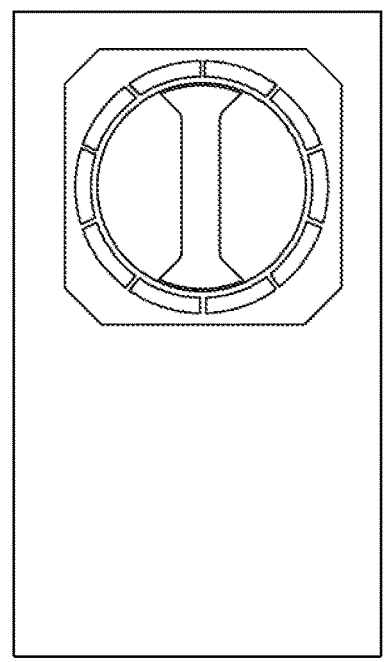
FIG. 5N  FIG. 5O
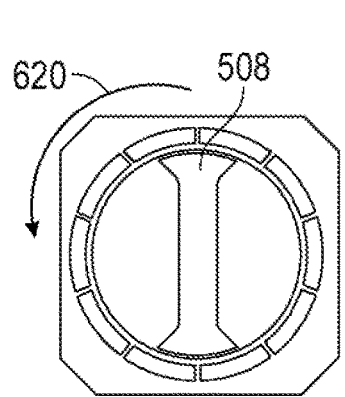 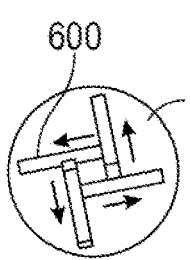 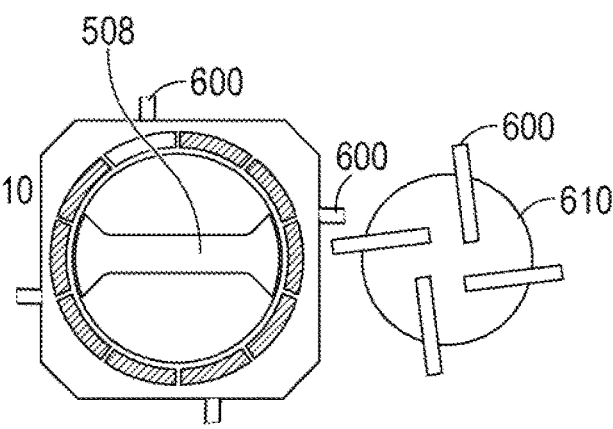 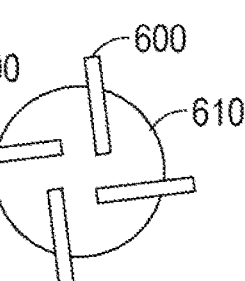
FIG. 6A  FIG. 6B  FIG. 6C  FIG. 6D

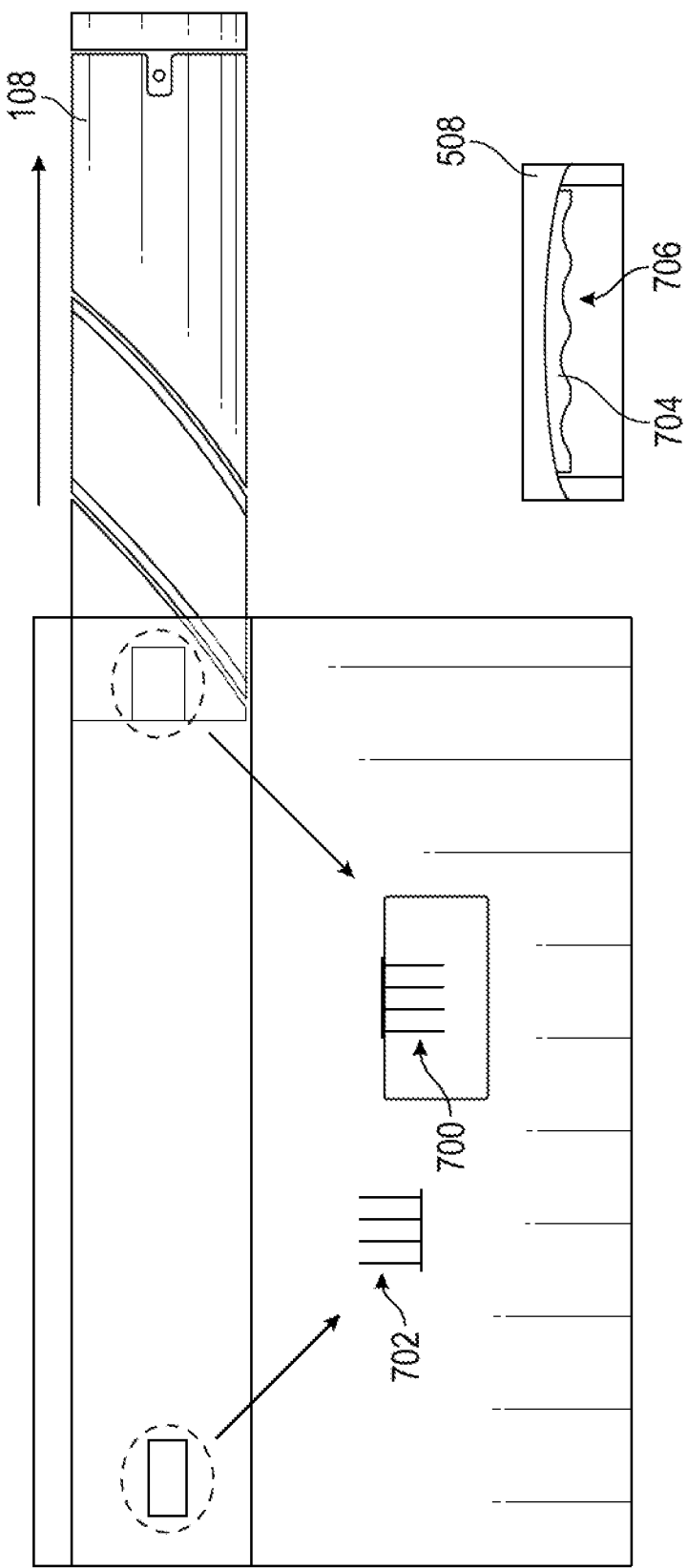

MULTI-FUNCTIONAL BUILDING POWER MANAGEMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 and should be considered a part of this specification.

FIELD

This disclosure relates to a multi-functional building power management system and methods.

BACKGROUND

In recent years, renewable energy power generation has developed rapidly because of its environment-friendly characteristics. Distributed power generation technology has been adopted, and combined energy storage system and load construction into microgrid has become the focus of power industry. Due to the inherent intermittence and unpredictability of renewable energy, the imbalance of power supply and demand may be frequent in microgrid, resulting in a decrease of power quality. The energy storage system can absorb energy and ensure the stable and continuous supply of electric energy.

Energy plays an important role in the progress and development of modern society. However, with the current rate of development of modern society, the consumption of energy is rapidly increasing, which may cause environmental problems and eventual shortage of traditional energy sources such as coal, oil, natural gas, and the like. Accordingly, many countries, especially the developed countries, having realized that the development of human society can no longer be at the expense of the environment, have prioritized the development and utilization of renewable energy as an integral part of their national energy strategy development. In the above context, the new energy represented by wind power generation and photovoltaic power generation, because of its many characteristics of environmental protection requirements, such as being clean, safe, low-carbon, sustainable, etc., is highly praised in the energy strategic development of many countries.

With the global energy supply shortage and the increasingly serious environmental pollution, more and more people realize the importance of new energy, especially solar energy and wind energy. It is reported that by the end of 2018, the cumulative installed capacity of photovoltaic in China has reached more than 170 GW. In 2018, affected by the 5.31 policy situation, China's installed capacity declined by about 43 GW year on year. Because the photovoltaic power generation depends on the light intensity, temperature and other aspects of the impact of large-scale grid connection, the stability of the entire power system has certain challenges. At the same time, with the development of economy and the progress of society, the peak valley difference of power supply and demand curve is becoming larger and larger, which causes the imbalance of power system supply and demand.

However, the existing household photovoltaic energy storage products are all integrated machines, which can only be fixed in residential buildings, public facilities, small factories and other places to provide power. If the household intends to go out for activities, the existing integrated household energy storage system cannot meet all the needs of the household.

SUMMARY

In accordance with one aspect of the disclosure, a building power storage and management system is provided. The building power storage and management system can include a power processing device, a stationary energy storage device, a non-transitory memory configured to store specific computer-executable instructions, and an electronic processor in communication with the non-transitory memory and configured to execute the specific computer-executable instructions. The power processing device can include a first electrical interface connected to an electrical grid, a second electrical interface connected to an external energy source, a third electrical interface connected to an electrical load of a building, and a fourth electrical interface connected to a charging dock configured to electrically connect to a portable energy storage device. The stationary energy storage device can store at least 5 kWh of electric energy and can include the charging dock. The portable energy storage device can store at least 1 kWh of electric energy. The processor can determine that the stationary energy storage device has an equal or lower charge state than the portable energy storage device during a first charging period. The processor can further, in response to determining that the stationary energy storage device has the equal or lower charge state than the portable energy storage device during the first charging period, cause the power processing device to charge the stationary energy storage device in a first charging operation (or mode) by directing electric energy from the external energy source or from the electrical grid to the stationary energy storage device. The processor can further determine that the stationary energy storage device has a higher charge state than the portable energy storage device during a second charging period. The processor can further, in response to determining that the stationary energy storage device has the higher charge state than the portable energy storage device during the second charging period, cause the power processing device to charge the portable energy storage device in a second charging operation by directing electric energy from the stationary energy storage device to the portable energy storage device.

The processor can further determine that the stationary energy storage device and the portable energy storage device have an equal charge state during the first charging period, and in response to determining that the stationary energy storage device and the portable energy storage device have the equal charge state during the first charging period, cause the power processing device to charge the portable energy storage device in a third charging operation by directing electric energy from the stationary energy storage device to the portable energy storage device simultaneously or intermittently with the first charging operation.

The processor can further determine that electric energy from the external energy source and from the electrical grid is unavailable and that the stationary energy storage device stores electric energy during a first discharging period, and in response to determining that electric energy from the external energy source and from the electrical grid is unavailable and that the stationary energy storage device stores electric energy during the first discharging period, cause the power processing device to discharge the stationary energy storage device in a first discharging operation by directing electric energy from the stationary energy storage device to the electrical load of the building.

The processor can further determine that electric energy from the external energy source, from the electrical grid, and from the stationary energy storage device is unavailable and that the portable energy storage device stores electric energy during a second discharging period, and in response to determining that electric energy from the external energy source, from the electrical grid, and from the stationary energy storage device is unavailable and that the portable energy storage device stores electric energy during the second discharging period, cause the power processing device to discharge the portable energy storage device in a second discharging operation by directing electric energy from the portable energy storage device to the electrical load of the building.

The electronic processor can cause the power processing device to switch between different charging modes and discharging modes based at least in part on charge level of the stationary energy storage device and charge level of the portable energy storage device.

The portable energy storage device can include a locking mechanism that can secure the portable energy storage device within the charging dock of the stationary energy storage device. When the locking mechanism is in an unlocked position, the portable energy storage device can be disconnected from the stationary energy storage device such that the portable energy storage device does not receive power from the stationary energy storage device. When the locking mechanism is in a locked position, the portable energy storage device can be connected to the stationary energy storage device such that the portable energy storage device receives power from the stationary energy storage device. The portable energy storage device can include a charge indicator configured to indicate charge level of the portable energy storage device. The charge indicator can turn off when the locking mechanism is in an unlocked position, and turn on when the locking mechanism is in a locked position. The locking mechanism can include pins configured to move between an unactuated position and an actuated position. Based at least in part on a position of a handle of the portable energy storage device, the pins in the unactuated position can be retracted and allow the portable energy storage device to be inserted into or removed from the charging dock and the pins in the actuated position can extend outward and away from a body of the portable energy storage device and prevent the portable energy storage device from being removed from the charging dock.

When in the first charging operation, the power processing device can charge the portable energy storage device, wherein a charge rate associated with the stationary energy storage device is greater than a charge rate associated with the portable energy storage device. When in the second charging operation, the power processing device can charge the stationary energy storage device, wherein a charge rate associated with the stationary energy storage device is slower than a charge rate associated with the portable energy storage device.

The stationary energy storage device can have at least 10 kWh of electric storage capacity. The portable energy storage device can have at least 0.5 kWh and no more than 2 kWh of electric storage capacity. The stationary storage device can have at least five times more capacity than the portable storage device, and wherein the stationary storage device can charge the portable storage device even when the stationary storage device is not connected to the power grid. The power drawn from the portable energy storage device can be transferred to and stored in the stationary energy storage device prior to being supplied to the electrical load. Alternatively, the power from the portable energy storage device can be directly transferred to the electrical load bypassing the stationary energy storage device.

The stationary storage device can include an active temperature control system with a liquid coolant circuit.

In accordance to another aspect of the disclosure, a method of managing power storage and distribution for a building is provided. The method can be performed by an electric processor of a power storage and management system. The method can include determining that a stationary energy storage device has an equal or lower charge state than a portable energy storage device during a first charging period. The method can further include, in response to determining that the stationary energy storage device has the equal or lower charge state than the portable energy storage device during the first charging period, causing a power processing device to charge the stationary energy storage device in a first charging operation by directing electric energy from an external energy source or from an electrical grid to the stationary energy storage device. The method can further include determine that the stationary energy storage device has a higher charge state than the portable energy storage device during a second charging period. The method can further include, in response to determining that the stationary energy storage device has the higher charge state than the portable energy storage device during the second charging period, cause the power processing device to charge the portable energy storage device in a second charging operation by directing electric energy from the stationary energy storage device to the portable energy storage device.

The method can further include determining that the stationary energy storage device and the portable energy storage device have an equal charge state during the first charging period, and, in response to determining that the stationary energy storage device and the portable energy storage device have the equal charge state during the first charging period, causing the power processing device to charge the portable energy storage device in a third charging operation by directing electric energy from the stationary energy storage device to the portable energy storage device simultaneously or intermittently with the first charging operation.

The method can further include determining that electric energy from the external energy source and from the electrical grid is unavailable and that the stationary energy storage device stores electric energy during a first discharging period, and, in response to determining that electric energy from the external energy source and from the electrical grid is unavailable and that the stationary energy storage device stores electric energy during the first discharging period, causing the power processing device to discharge the stationary energy storage device in a first discharging operation by directing electric energy from the stationary energy storage device to the electrical load of the building.

The method can further include determining that electric energy from the external energy source, from the electrical grid, and from the stationary energy storage device is unavailable and that the portable energy storage device stores electric energy during a second discharging period, and, in response to determining that electric energy from the external energy source, from the electrical grid, and from the stationary energy storage device is unavailable and that the portable energy storage device stores electric energy during the second discharging period, causing the power processing device to discharge the portable energy storage device in a second discharging operation by directing electric energy from the portable energy storage device to the electrical load of the building.

The power management device is suitable to provide power to a building such as a residence and can be configured for indoor or outdoor use. The power management device can include a battery pack connected to an electrical grid and/or to an energy source (e.g., solar power source) via the main electrical bus of the house. The energy source can be separate and external to or integrated with the power management device. The power management system can include an integrated charging dock for receiving, storing, and charging a portable, energy storing device. The portable energy storage device can have at least 1 kWh of electric power storage capacity. The portable energy storage device and the power management system together can have at least 10 kWh of electric power storage capacity.

The power management system can include a charging controller, or a processor, configured to operate in multiple charging and discharging modes. The power management system can include a stationary energy storage device. The charging controller can operate in a first charging operation (or mode) when the portable energy storage device is disconnected from the charging dock or when the charge level of the stationary energy storage device is less than the charge level of the portable energy storage device. In the first charging operation, the power management system can draw power from the grid and/or from the energy source to recharge the stationary energy storage device. The charging controller can operate in a second charging operation when the portable energy storage device is present in the charging dock and the charge level of the energy storage device is less than the charge level of the stationary energy storage device. In the second charging operation, the charging controller can preferentially charge the portable energy storage device. The charging controller can operate in a third charging mode when the portable energy storage device is present in the charging dock and the charge levels of the stationary energy storage device and portable energy storage device are approximately equal. In the third charging mode, the charging controller can charge both the stationary energy storage device and the portable energy storage device at the same rate.

The charging controller can operate in a first discharging mode during periods when the energy source (e.g., solar power cell) is unavailable and/or during a power outage on the electrical grid. In the first discharging mode, the power management system can provide electric power to a building (e.g., a residence) via the main electrical bus. The charging controller can operate in a second discharging mode when the energy source and main power (e.g., the electrical grid) is unavailable, when the stationary energy storage device is substantially or fully discharged, and/or when the portable energy storage device is present (e.g., docked) in the charging dock. In the second discharging mode, the portable energy storage device can provide emergency reserve electric power to, for example, the building connected to the power management system.

The power management system can include a network communications device that communicates with user computing devices. The user computing devices can receive updates, alerts, alarms, notifications, and the like from the power management system. For example, when the charging controller switches from the first discharging mode to the second discharging mode, the power management system can issue one or more notifications to user computing devices to indicate that the power management system is using emergency reserve power.

The electrical connection between the stationary power storage device and the portable power storage device can include 4 conductors: 2 grounds, a positive electrode, and a negative electrode. The use of 2 ground conductors increases the safety and reliability of the storage device and portable power module.

When the portable energy storage device is inserted into or removed from the charging dock the storage device, one or more sealing members (such as, for example, flaps, seals, or doors) of the charging dock can seal the charging dock from the ambient environment. This can advantageously protect electrical components of the charging dock from rain, snow, dust, etc., and makes the storage device more suitable for indoor or outdoor use.

The power management system can include a liquid cooling circuit that regulates the temperature of the power management system. Additionally and/or alternatively, the portable energy storage device can be passively cooled by thermal conduction from battery cells to the casing of the portable energy storage device. The casing of the portable energy storage device and other thermal management components can include or be made our of materials with high thermal conductivity (e.g., steel) to provide passive thermal management for the portable energy storage device's battery cells. The portable energy storage device's casing can incorporate graphene or other high-conductivity materials that can be layered over the steel casing to improve thermal management (e.g., thermal transfer).

The portable energy storage device can weigh no more than 25-30 pounds while including at least 1 kWh of electric storage capacity. The portable energy storage device may include one or more 110 V electric outlets and one or more USB charging ports. In some implementations, the portable energy storage device can provide sufficient current and voltage to jump start a vehicle with a drained battery. The portable energy storage device can include a built-in flashlight and lantern. Additionally, the portable energy storage device can include a power cord that permits the portable power module to recharge via a standard electrical outlet.

The portable energy storage device can include a locking mechanism that prevents accidental detachment of the portable energy storage device from the charging dock of the power management system. In some implementations, the locking mechanism can include a rotatable handle and actuatable pins. In some embodiments, the rotatable handle can be turned 90 degrees (or some other suitable amount) and the rotation of the handle can actuate the pins between a locked position and a unlocked position. When the pins are in the locked position, the pins secure the portable energy storage device to the charging dock of the power management system. When the actuatable pins are in the locked position, the portable energy storage device may be connected to the charging dock for charging, and the portable energy storage device may be secured to the charging dock so that it cannot be removed. When the actautable pin are in the unlocked position, the portable energy storage device can be removed from the charging dock.

The user computing devices can cause (e.g., program) the power management system to update scheduled times when the power management system charges (e.g., during daytime hours) and discharges (e.g., at night). The power management system can be programmed (e.g., by a user) with different minimum/maximum charge levels for (1) when the electrical grid is available, (2) when the energy source is available, (3) when the electrical grid is not available, and/or (4) when the energy source is not available. Once the minimum charge level is reached for a given condition, the discharging modes may be unavailable.

For purposes of summarizing the disclosure, certain aspects, advantages, and novel feature are discussed herein. It is to be understood that not necessarily all such aspects, advantages, or features will be embodied in any particular embodiment of the invention, and an artisan would recognize from the disclosure herein a myriad of combinations of such aspects, advantages, or features.

BRIEF DESCRIPTION OF THE DRAWINGS

Various embodiments will be described hereinafter with reference to the accompanying drawings. The drawings and the associated descriptions are provided to illustrate embodiments of the present disclosure and do not limit the scope of the claims. In the drawings, similar elements have similar reference numerals.

FIGS. 4A-4C illustrate wiring diagrams showing electrical connections of the power management system of FIG. 1.

FIGS. 5D-5M illustrate different charge indicator displays of an embodiment of a portable energy storage device of the power management system of FIG. 1 showing different charge statuses of the portable energy storage device shown in FIG. 5A.

FIGS. 5N and 5O illustrate different charge indicator displays of an embodiment of a portable energy storage device of the power management system of FIG. 1 showing different indicator displays based on connection status of the portable energy storage device of FIGS. 5D-5M.

FIG. 6A illustrates a schematic view of a handle of the portable energy storage device of FIGS. 5D-5M when the portable energy storage device is in an unlocked configuration.

FIG. 6B illustrates a schematic view of a lock mechanism of the portable energy storage device of FIGS. 5D-5M when the portable energy storage device is in the unlocked configuration.

FIG. 6C illustrates a schematic view of the handle of the portable energy storage device of FIGS. 5D-5M when the portable energy storage device is in a locked configuration.

FIG. 6D illustrates a schematic view of the lock mechanism of the portable energy storage device of FIGS. 5D-5M when the portable energy storage device is in the locked configuration.

FIG. 7A illustrates a schematic view showing coupling between a charging dock of a stationary energy storage device and a portable energy storage device.

FIG. 7B illustrates a side view of a handle of the portable energy storage device of FIG. 7A.

Figure 1:
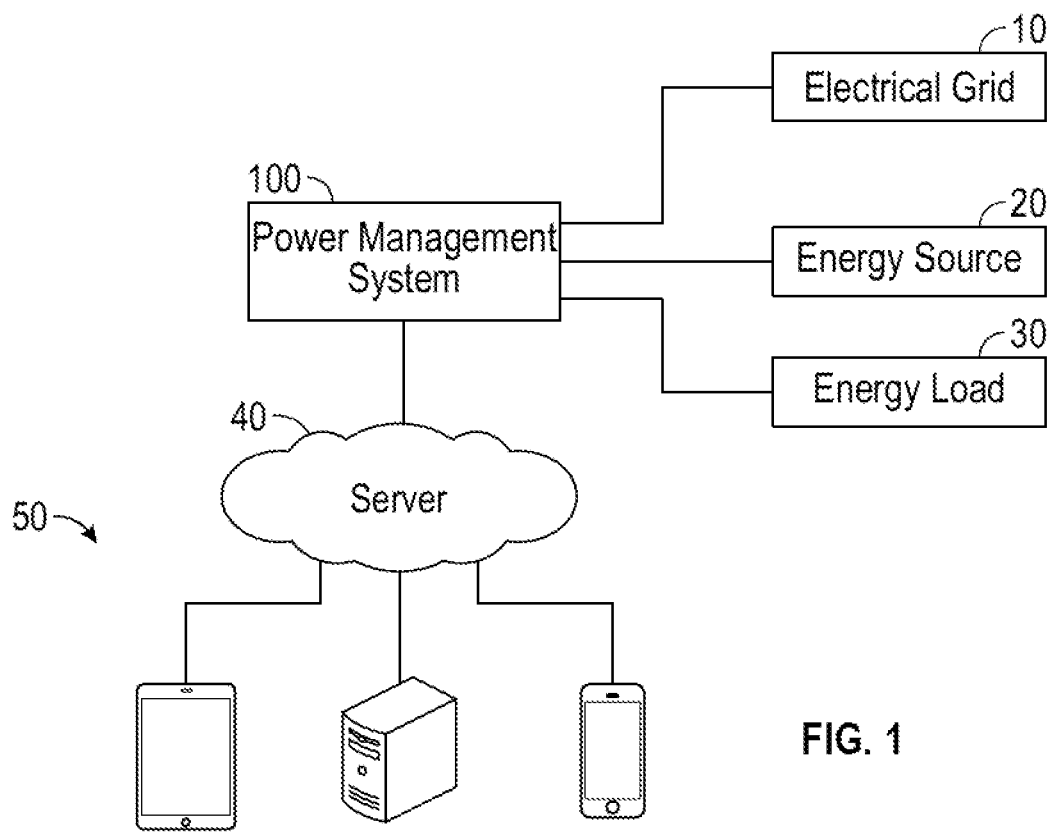
FIG. 1 illustrates a block diagram showing an example operating environment of a power management system.

The foregoing and other features of the present development will become more fully apparent from the following description and appended claims, taken in conjunction with the accompanying drawings. Understanding that these drawings depict only several embodiments in accordance with the development and are not to be considered limiting of its scope, the development will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present development, as generally described herein, and illustrated in the drawings, can be arranged, substituted, combined, and designed in a wide variety of different configurations, all of which are explicitly contemplated and make part of this disclosure.

DETAILED DESCRIPTION

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

FIG. 1 illustrates a block diagram showing an example operating environment of a power management system 100. The power management system 100 can be connected to an electrical grid 10, an energy source 20, an electrical load 30, and a server 40. The power management system 100 can draw (or purchase) energy from the electrical grid 10 or direct (or sell) energy to the electrical grid 10. The power management system 100 can receive and store energy generated by the energy source 20. The energy source 20 may be external energy sources for the power management system 100 such as, for example, photovoltaic power generator, geothermal power generator, and the like. In some implementations, there may be some excess energy received from the energy source 20. In such situations, the power management system 100 can direct the excess energy back to the electrical grid 10.

The power management system 100 can supply energy to the electrical load 30. For example, the power management system 100 may be a part of a household and the electrical load 30 may include devices or appliances of the household that require electric energy to operate. In some implementations, the electrical load 30 can include critical load and non-critical load, and the power management system 100 can prioritize the critical load (for example, medical devices, refrigerator, heather, air conditioning unit, and the like) over the non-critical load (for example, television, electronic vehicle charging unit, and the like).

The power management system 100 communication with user computing devices 50 via a server 40. For example, the server 40 is web-based and allows the energy distribution 100 to transmit data to the server 40, store data in the server 40, and retrieve or access data from the server 40. The server 40 can include one or more of a LAN, WAN, the Internet, or cloud computing networks, for example, via a wired, wireless, or combination of wired and wireless, communication links. The user computing device 50 can communicate with the power management system 100 via the server 40.

The power management system 100 can provide useful data to the user computing devices 50 via the server 40. For example, the power management system 100 can provide energy usage data associated with the electrical load 30, amount of energy generated (for example, in kW-hr) by the energy source 20, amount of energy stored within the power management system 100, amount of energy purchased from/sold to the electrical grid 10, and the like. In some implementations, users can, via the user computing devices 40, control operation of devices that are part of the electrical load 30 by controlling energy supply to the electrical load 30. For example, a user may be able to disable his electrical vehicle charging unit during peak hours (that is, times when electricity price is typically higher than other times during the day) to reduce the energy cost. Additionally, users can monitor the amount of energy stored within the power management system 100 via the user computing devices 50. In some implementations, users may be able to manually control the amount of energy stored within the power management system 100.

Figure 2:
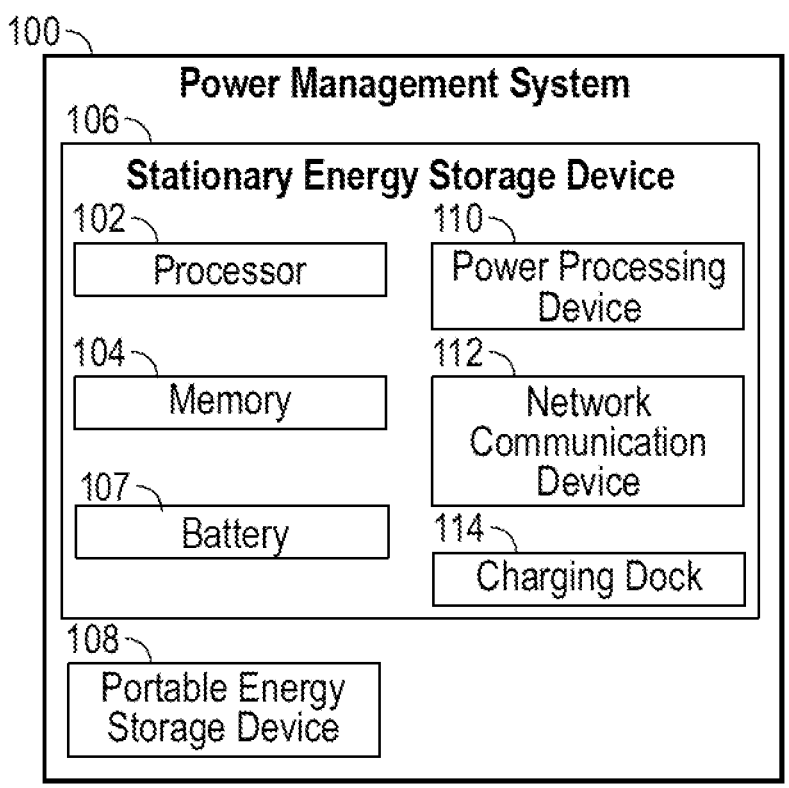
FIG. 2 illustrates a block diagram of the power management system of FIG. 1.

FIG. 2 illustrates a block diagram of the power management system 100. The power management system 100 can include a stationary energy storage device 106 and a portable energy storage device 108. The stationary energy storage device 106 can include a processor 102 (e.g., a controller), a memory 104, a battery 107, a power processing device 110, a network communication device 112, and a charging dock 114. The processor 102, the memory 104, the battery 107, the power processing device 110, the network communication device 112, and the charging dock 114 may be housed together in a single unit.

The processor 102 can communicate with other components of the power management system 100. The processor 102 which may include one or more conventional microprocessors that comprise hardware circuitry configured to read computer-executable instructions and to cause portions of the hardware circuitry to perform operations specifically defined by the circuitry. The processor 102 (e.g., controller) can control, for example, charging and discharging of the stationary energy storage device 106 and the portable energy storage device 108. In some implementations, the processor 102 can control receiving or drawing power from the electrical grid 10 or the energy source 20. In some implementations, the processor 102 can control transmitting (e.g., selling power) power to the electrical grid 10. The processor 102 can detect charge levels or charge rates of the stationary energy storage device 106 or the portable energy storage device 108.

The memory 104 can be a random access memory ("RAM") for temporary storage of information and read only memory ("ROM") for permanent storage of information, which may store some or all of the computer-executable instructions prior to being communicated to the processor for execution.

The memory 104 or electronic storage device can be as a hard drive, diskette, CD-ROM drive, a DVD-ROM drive, or optical media storage device, that may store the computer-executable instructions for relatively long periods, including, for example, when the computer system is turned off.

The battery 107 of the stationary energy storage device 106 may be a large capacity, high output power battery (or batteries). For example, the battery 107 may include a built-in high-capacity lithium battery with online UPS (uninterruptible power supply) that can include, for example, photovoltaic input, municipal power input (e.g., power input that can be connected to a standard 110 VAC wall connector), AC output, and off-grid output, etc. The battery 107 may receive power from the power processing device 110 and store the power for future use.

The portable energy storage device 108 may be a high-capacity, high-output energy storage unit. For example, the portable energy storage device 108 may include a built-in high-capacity lithium battery (or batteries) with online UPS (without power-off system). For example, the portable energy storage device 108 can include a battery 300 (or batteries) with battery capacity of 1 kWh (for example, with 12.8 V DC and 75 Ah). In some implementations, the portable energy storage device 108 can include a photovoltaic input, via which the portable energy storage device 108 can receive energy from photovoltaic cells. The photovoltaic input may allow for direct current (DC) power input. Additionally, the portable energy storage device 108 can include a municipal power input that allows the portable energy storage device 108 to draw power from standard municipal power source. The portable energy storage device 108 can include a number of power outputs that may include, but not limited to, USB output ports, AC outputs, and a startup power output.

The power processing device 110 of the stationary energy storage device 106 can receive power from various sources including, but not limited to, the electrical grid 10 and the energy source 20 (for example, photovoltaic cells). The power processing device 110 can convert between direct currents (DC) and alternating currents (AC) to facilitate distribution between and storage of energy in, for example, the stationary energy storage device 106 and the portable energy storage device(s) 108. In some implementations, the power processing device 110 is an inverter. In some implementations, the power processing device 110 can be an inverter (solar charging, 300-500 Vdc, 7-10 kW; municipal charging, 110 VAC/220 VAC, ±10%; municipal output 110 VAC/220 VAC, ±10%). In some implementations, the power processing device 110 may be a double inverter.

The network communication device 112 of the stationary energy storage device 106 can establish wireless or wired communication with the server 40 and communicate with the user computing device 50. The network communication device 112 can allow real-time monitoring and management of the power management system 100.

The charging dock 114 of the stationary energy storage device 106 can removably couple with the stationary energy storage device 106. In some implementations, the charging dock 114 can include electrical connectors that that mate with corresponding electrical connectors of the portable energy storage device 108. Connections between the electrical connectors of the charging dock 114 and corresponding electrical connectors of the portable energy storage device 108 can allow the power management system 100 to charge (e.g., transmit power to) the portable energy storage device 108. In some implementations, the power management system 100 can include more than one charging docks 114.

Figure 3:
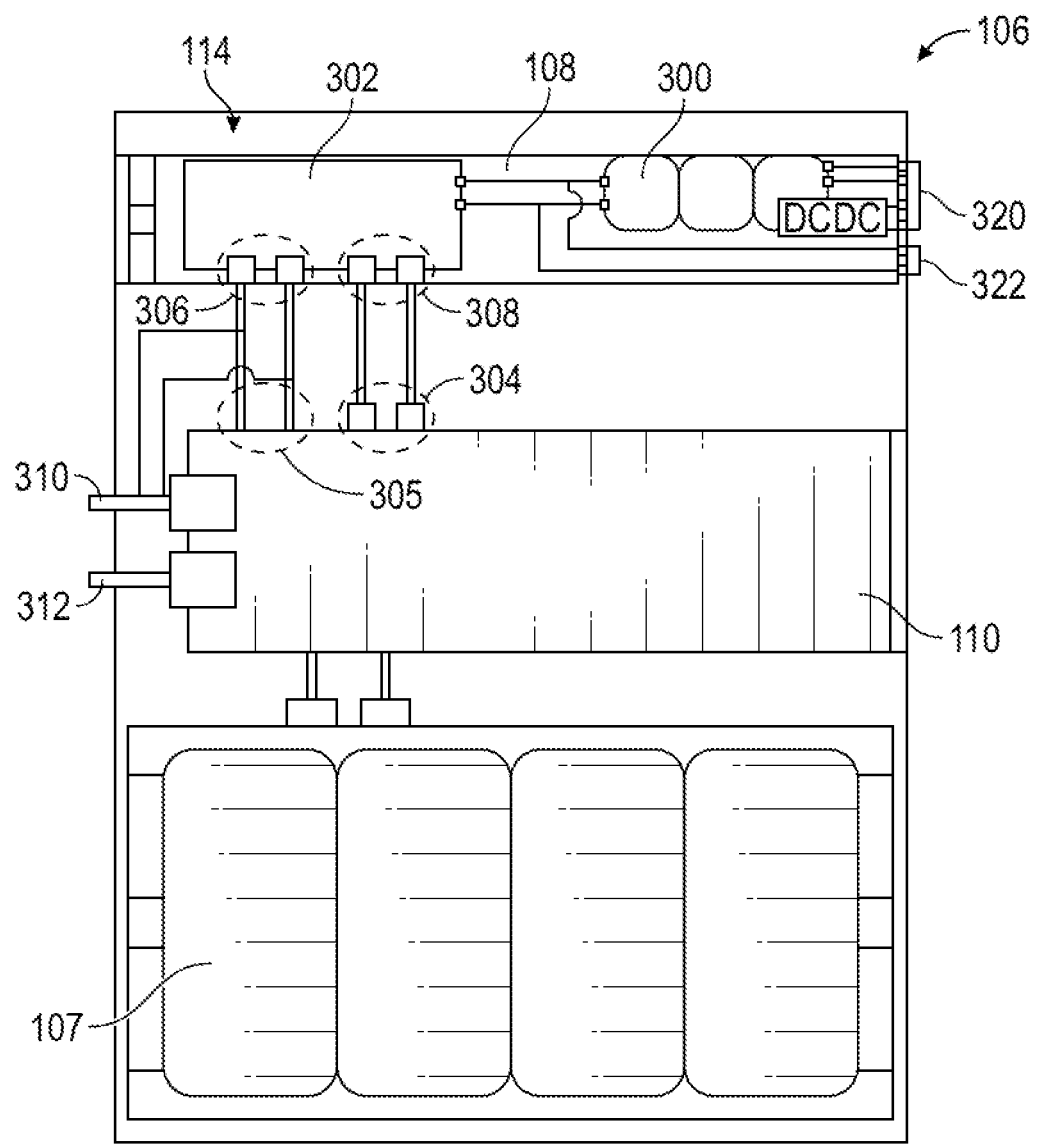
FIG. 3 illustrates a schematic diagram showing a stationary energy storage device and a portable energy storage device of the power management system of FIG. 1.

FIG. 3 illustrates a schematic diagram of the stationary energy storage device 106 and the portable energy storage device 108. In the example illustrated in FIG. 3, the power processing device 110 can include a first output 304, a second output 305, a first input 310, and a second input 312. The first output 304 may be an alternating current (AC) output for transmitting AC power to, for example, the portable energy storage device 108. The second output 305 may be a direct current (DC) output for transmitting DC power from the power processing device 110 to, for example, the portable energy storage device 108. The first input 310 may facilitate power transmission from the energy source 20 to the stationary energy storage device 106. The first input may be in DC. The second input 312 may facilitate power transmission between the electrical grid 10 and the stationary energy storage device 106. As described herein, the stationary energy storage device 106 can draw power from the energy source 20 and direct power to (e.g., sell the power to) the electrical grid 10. For example, when the portable energy storage device 108 is not connected to the stationary energy storage device 106 and the charge of the stationary energy storage device 106 is full (e.g., cannot be charged further), the power generated by the energy source 20 (e.g., solar cells) may directed to and sold to the electrical grid 10. Additionally, the power generated by the energy source 20 (e.g., solar cells) may directed to and sold to the electrical grid 10 when the charge of both the stationary energy storage device 106 and the portable energy storage 108 (e.g., when the portable energy storage device 108 is connected to the charging dock 114) is full (e.g., cannot be charged further).

The portable energy storage device 108 can include a first input 306 and a second input 308. The first input 306 may receive DC power from the power processing device 110 or the energy source 20 via the first input 310. The first input 310 of the power processing device 110 and the first input 306 of the portable energy storage device 108 may be directly connected to allow direct power transmission between the energy source 20 and the portable energy storage device 108. The second input 308 may receive AC power from the power processing device 110. The DC power and the AC power received via the first input 306 and the second input 308, respectively, can be processed by an inverter 302 and stored in the battery 300. The portable energy storage device 108 include a number of outputs including, but not limited to, a DC output 320 and an AC output 322. The AC output 322 can draw AC power from the inverter 302. The DC output 320 can draw DC power form the battery 300. The DC power from the battery 300 via the DC output 320 can be used to, for example, provide power to start a vehicle. In some implementations, the DC output 320 can output 5 VDC with 1 A.

Figure 4A:
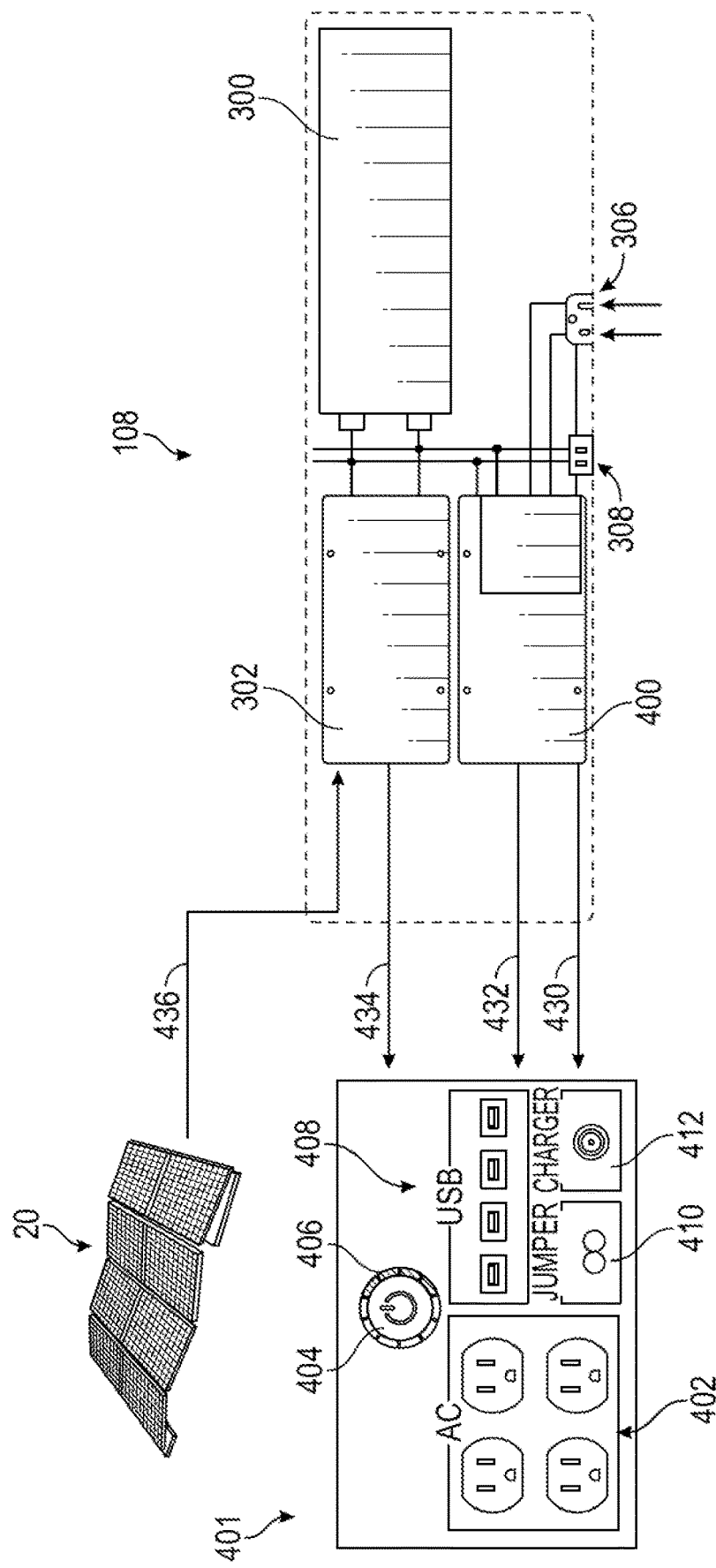
Figure 4C:
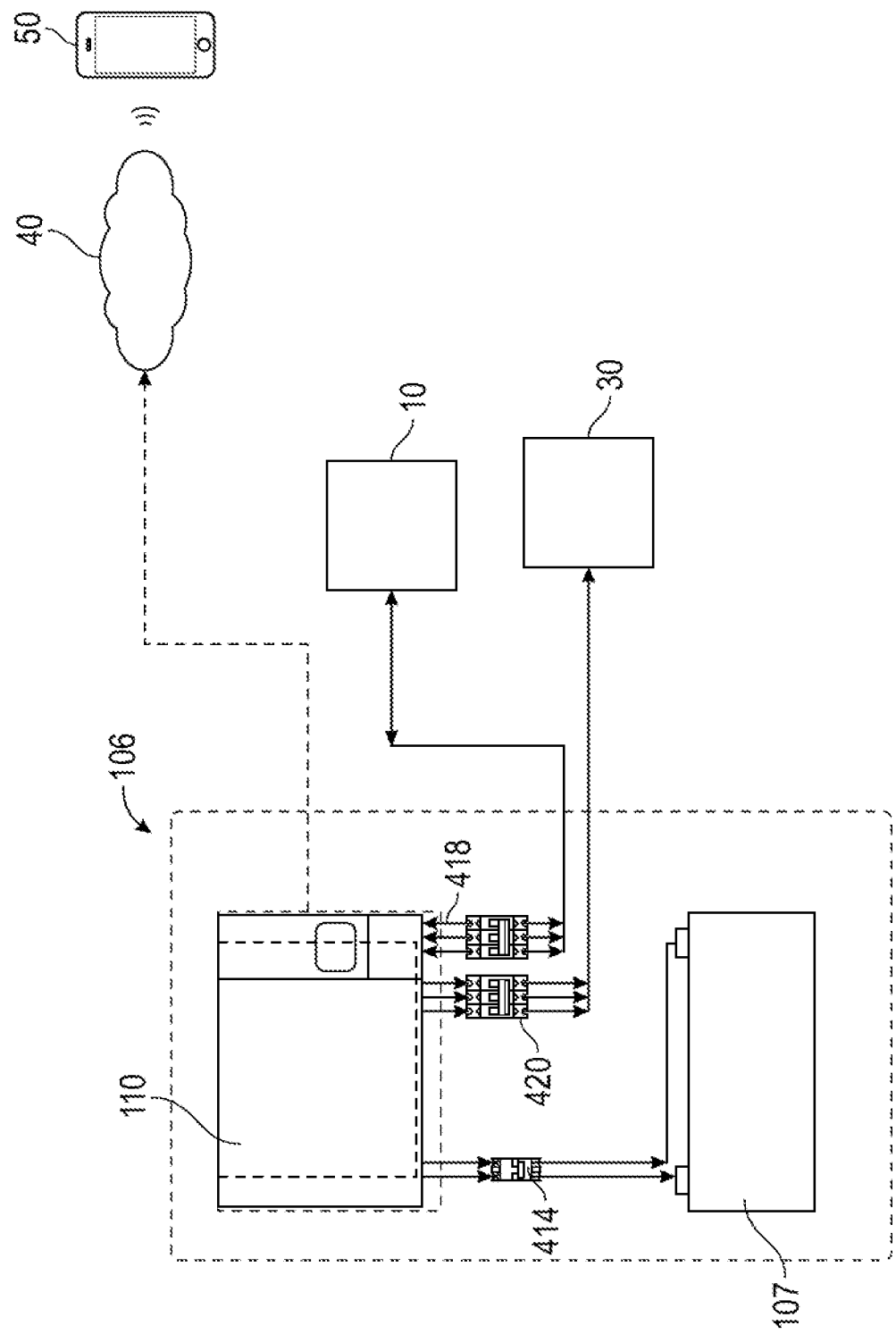

With references to FIGS. 4A-4C, additional details for the power management system 100 are described herein. As described herein, the portable power storage device 108 can directly (e.g., not via the power processing device 110) receive power 436 (e.g., DC power) from the energy source 20. The portable power storage device 108 can include a DC power distribution device 400. The DC power distribution device 400 can receive DC power or AC power which is converted to DC power. The DC power distribution device 400 can provide different DC power (e.g., 12 VDC/5 A or 5 VDC/1 A) for different types of power outlets.

The portable energy storage device 108 can include a panel 401 that can include a number of different outlets. For example, the panel 401 can include one or more USB ports 408, a jumper port 410, a charger port 412, and one or more AC outlets 402. The USB ports 408 can receive, for example, DC power 430 (e.g., 5 VDC/1 A) from the DC power distribution device 400. The jumper port 410 and a charger port 412 that can receive, for example, DC power 432 (e.g., 12 VDC/5 A) from the DC power distribution device 400. The jumper port 410 can be used to provide power to start a vehicle. The charger port 412 can be used to provide power to the portable energy storage device 108 from external power sources. For example, the portable energy storage device 108 can be connected to the energy source 20 (e.g., solar cells) so that power generated by the energy source 20 can be used to charge the portable energy storage device 108. In another example, a standard 12 VDC adapter can be plugged into a standard AC wall outlet and connected to the portable energy storage device 108 to provide power for the portable energy storage device 108. As such, the portable energy storage device 108 can receive power from sources other than the stationary energy storage device 106. The AC outlets 402 can receive AC power 434 (e.g., 115 VAC/500 W) from the inverter 302 of the portable energy storage device 108 to provide AC power to other devices (e.g., monitors, computers, mobile devices, etc.).

The panel 401 can include a power button 404 and a charge indicator 406. The charge indicators 406 may be light-generating devices that are positioned around the power button 404. The example illustrated in FIG. 4A, the power button 404 is circular in shape and the charge indicators 406 are positioned around the outer circumference of the power button 404. The charge indicators 406 can light up in a sequence to indicate a charge level of the portable energy storage device 108. For example, the charge indicators 406 can light up sequentially in a clockwise manner when charging. When discharging, the charging indicators 406 can turn off sequentially in a counterclockwise manner.

The stationary energy storage device 106 can include one or more circuit breakers that can connect and disconnect connections within the stationary energy storage device 106 and connections between the stationary energy storage device 106 and the electrical grid 10 and the energy source 20. The stationary energy storage device 106 can include a first circuit breaker 414, a second circuit breaker 416, a third circuit breaker 418, and a fourth circuit breaker 420. The first circuit breaker 414 can control electrical connections between the battery 107 and the power processing device 110. The second circuit breaker 416 can control electrical connections between the power processing device 110 and the energy source 20 (e.g., solar cells). The third circuit breaker 418 can control electrical connections between the power processing device 110 and the electrical grid 10. The fourth circuit breaker 420 can control electrical connections between the power processing device 110 and the electrical load 30. By adjusting, for example, the positions or the orientations of the circuit breakers 414, 416, 418, 420, users may be able to manually control the connections between the power management system 100 with the electrical grid 10, the energy source 20, and the electrical load 30.

In the example illustrated in FIG. 4B, the power generated by the energy source 20 can be transmitted to the power processor 110 via a combiner 450. The combiner 450 can combine, monitor, and control power outputs from solar cells. The combiner 450 can consolidate power outputs from multiple solar cells into a single power output (e.g., DC power output) and transmits the single power output to the power processing device 110.

Figure 5A:
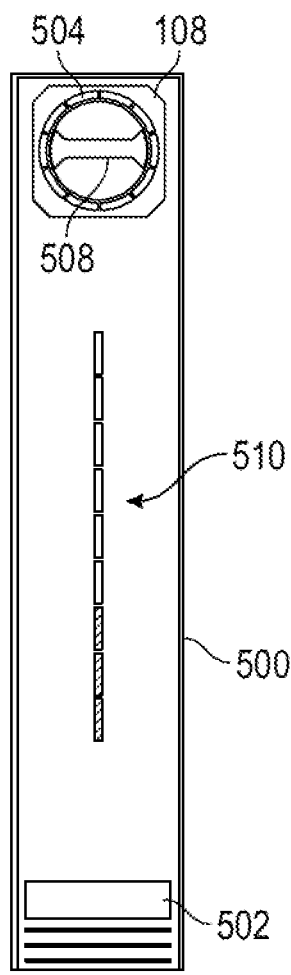
FIG. 5A illustrates a side view of an embodiment of a stationary energy storage device of the power management system of FIG. 1.
Figures 5B, 5C:
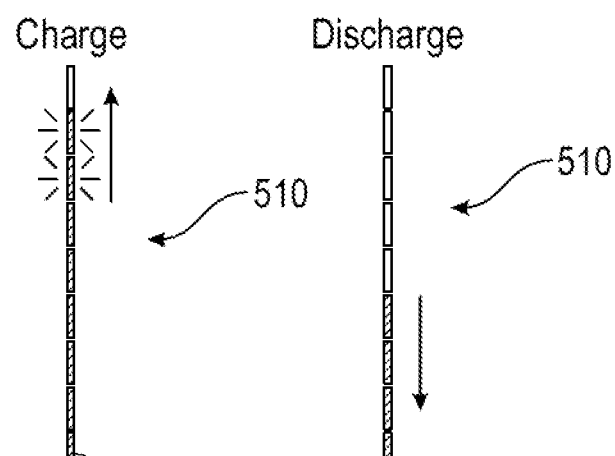
FIGS. 5B and 5C illustrate schematic views of a charge indicator of the stationary energy storage device of FIG. 5A.

With references to FIG. 5A-5C, as described herein, the processor 102, the memory 104, the battery 107, the power processing device 110, the network communication device 112, and the charging dock 114 of the stationary energy storage device 106 can be housed or stored within an enclosure 500. FIG. 5A illustrates a side view of the enclosure 500. The side of the enclosure 500 can include the charging dock 114 for receiving the portable energy storage device 108 and a charge indicator 510. The charge indicator 510 can include lights that are positioned, for example, vertically along the height of the enclosure 500. The lights can turn on and off to indicate a charge level for, for example, the stationary energy storage device 106. For example, bottom three of a total of ten lights can turn on to indicate that the stationary energy storage device 106 has approximately 30% charged (e.g., with respect to the maximum charge capacity). In another example, the bottom seven of the total of ten lights can turn on to indicate that the stationary energy storage device 106 has approximately 70% charged (e.g., with respect to the maximum charge capacity).

The enclosure 500 can include a status indicator 502. The status indicator 502 may generate different colors of light to indicate different statuses for the stationary energy storage device 106 including, but not limited to, connected to/disconnected from the electrical grid 10, connected to/disconnected from the energy source 20, connected to/disconnected from the electrical load 30, and the battery 107 is charging/discharging.

The lights of the charge indicator 510 can turn on sequentially during charge and discharge. For example, during charge, lights can turn on sequentially from the bottom. During discharge, lights can turn off sequentially from the top.

In some implementations, each of the lights of the charge indicator 510 can represent an equal portion of the maximum charge capacity of the stationary energy storage device 106. For example, the charge indicator 510 can include ten lights and each of the ten lights can represent 10% (or approximately 10%) of the maximum charge of the stationary energy storage device 106.

When the portable energy storage device 108 is inserted into the charging dock 114 of the, for example, the enclosure 500 of the stationary energy storage device 106, a charge indicator 504 of the portable energy storage device 108 can indicate charge status of the portable energy storage device 108. As shown in FIG. 5A, the portable energy storage device 108 can include a handle 508 and the charge indicator 504 disposed in a circular manner around the handle 508.

FIGS. 5D-5M illustrate different configuration of the charge indicator 504 of the portable energy storage device 108 at different charge levels. For example, the charge indicator 504 can include ten lights that can turn of and off, and represent approximately 10% charge level for the portable energy storage device 108. For example, as shown in FIG. 5E, two lights of the charge indicator 504 are lit to indicate that the portable energy storage device 108 has about 20% charge.

In some implementations, lights of the charge indicator 504 can blink to provide additional details of the charge level. For example, the third light of the charge indicator 504 (e.g., the light positioned at 3'o clock position) may blink during charge to indicate that the charge level is greater than 20% and less than 30%. Once the charge level reaches 30%, the third light of the charge indicator 504 can become solid. Once the charge level is greater than 30% and less than 40%, the fourth light of the charge indicator 504 (e.g., the light positioned at 4'o clock position) may begin to blink.

With references to FIGS. 5N and 5O, the charge indicator 504 of the portable energy storage device 108 can indicate connection or coupling status between the charging dock 114 and the portable energy storage device 108. When the portable energy storage device 108 is fully coupled with the charging dock 114 (e.g., corresponding electrical connectors between the portable energy storage device 108 and the charging dock 114 are fully connected to enable charging of the portable energy storage device 108), the charge indicators 504 may be activated to show the current charge level of the portable energy storage device 108. On the other hand, when the portable energy storage device 108 is not fully coupled with the charging dock 114 (e.g., corresponding electrical connectors between the portable energy storage device 108 and the charging dock 114 are not connected to enable charging of the portable energy storage device 108), the charge indicators 504 may be deactivated (e.g., turned off) and do not show the current charge level of the portable energy storage device 108. In some implementations, when the charge indicators 504 are deactivated, the lights may remain on in a different color instead of turning off. For example, when activated, the charge indicators 504 may turn green, and may turn yellow when deactivated.

With references to FIGS. 6A-6D, the portable energy storage device 108 may include a locking mechanism to prevent accidental decoupling between the portable energy storage device 108 and the charging dock 114. The portable energy storage device 108 may be inserted into the charging dock 114 in an orientation shown in FIG. 6A (e.g., the handle 508 oriented vertically). In some implementations, the portable energy storage device 108 may only be inserted into the charging dock 114 when in the orientation shown in FIG. 6A (e.g., a first configuration). Once the portable energy storage device 108 is inserted in the charging dock 114, the handle 508 may be rotated in a direction 620 (e.g., counterclockwise) and assume the orientation shown in FIG. 6C (e.g., a second configuration). The portable energy storage device can include pins 600 that can be actuated by the rotation of the handle 508. For example, when the handle 508 is rotated in the direction 620 (e.g., moved from the orientation shown in FIG. 6A to the orientation shown in FIG. 6C), the pins 600 can actuate from a first position (e.g., unlocked position as shown in FIG. 6B) to a second position (e.g., locked position as shown in FIG. 6D). When the pins 600 are in the unlocked position, the pins 600 are retracted (e.g., towards the center) so that the portable energy storage device 108 can be inserted into or removed from the charging dock 114. When the pins 600 are in the locked position, the pins 600 can protrude beyond an outer edge of a front cover 610 of the portable energy storage device 108. The protrusion of the pins 600 can prevent the decoupling between the charging dock 114 and the portable energy storage device 108. In some implementations, the pins 600 can be inserted into corresponding grooves of the charging dock 114 that can receive portions of the pins 600 protruding beyond the outer edge of the front cover 610. The pins 600 can move from the second position to the first position when the handle is rotated in a direction opposite of the direction 620.

In some implementations, the rotation of the handle 508 (which causes the actuation of the pins 600) can cause the portable energy storage device 108 to move further into the charging dock 114 and allow the portable energy storage device 108 to be charged by the charging dock 114 (e.g., receive power from the power processing device 110). The additional movement of the portable energy storage device 108 caused by the rotation of the handle 508 can allow the electrical connectors of the charging dock 114 (e.g., the connectors 702) and of the portable energy storage device 108 (e.g., the connectors 700) to fully mate. As such, when the pins 600 are not actuated, the electrical connectors of the portable energy storage device 108 (e.g., the connectors 700) may not be able to fully mate with the corresponding electrical connectors of the charging dock 114 (e.g., the connectors 702) and the portable energy storage device 108 may not be able to receive power from the power processing device 110.

In some implementations, the actuation of the pins 600 can close a circuit within the portable energy storage device 108 to allow the portable energy storage device 108 to receive power from the power processing device 100. As such, even if the portable energy storage device 108 is fully inserted within the charging dock 114 (e.g., the connector of the portable energy storage device 108 and the corresponding connector of the charging dock 114 are fully mated), the portable energy storage device 108 cannot receive power from the power processing device 110 if the handle 508 is not rotated and thus the pins 600 are not actuated to the locked position.

FIG. 7A illustrates a schematic view showing the portable energy storage device 108 being inserted into the charging dock 114 of the stationary energy storage device 106. The charging dock 114 can include electrical connectors 702 that can mate with corresponding electrical connectors 700 of the portable energy storage device 108. For example, the electrical connectors 700 of the portable energy storage device 108 are slits formed on a body of the portable energy storage device 108 and the electrical connectors 702 of the charging dock 114 are strips that can be inserted into the slits. Once the portable energy storage device 108 is inserted into the charging dock 114, the electrical connectors 700 can couple with the electrical connectors 702 to allow the power processing unit 110 to charge (e.g., transmit power to) the portable energy storage device 108. It is contemplated that other types of suitable connectors may be used to establish connection between the portable energy storage device 108 and the charging dock 114. The connectors 702 may be associated with an AC output of the power processing device 110 and the connectors 700 may be associated with an AC input of the portable energy storage device 108.

In some implementations, the charging dock 114 can include a rail that facilitates the coupling between the charging dock 114 and the portable energy storage device 108. The rail can orient the portable energy storage device 108 in a certain way to allow the electrical connectors 700 of the portable energy storage device 108 to couple with the electrical connectors 702 of the charging dock 114. In some implementations, the rail can prevent the portable energy storage device 108 from being inserted into the charging dock 114 unless the portable energy storage device 108 is in a certain, predetermined orientation.

FIG. 7B illustrates a side view of the handle 508 of the portable energy storage device 108. The handle 508 can include a padding 704 formed on its underside and the padding 704 can include one or more recesses 706. The recesses 706 can represent locations where a user's fingers may wrap around the handle 508 when, for example, carrying the portable energy storage device 108.

Figure 8:
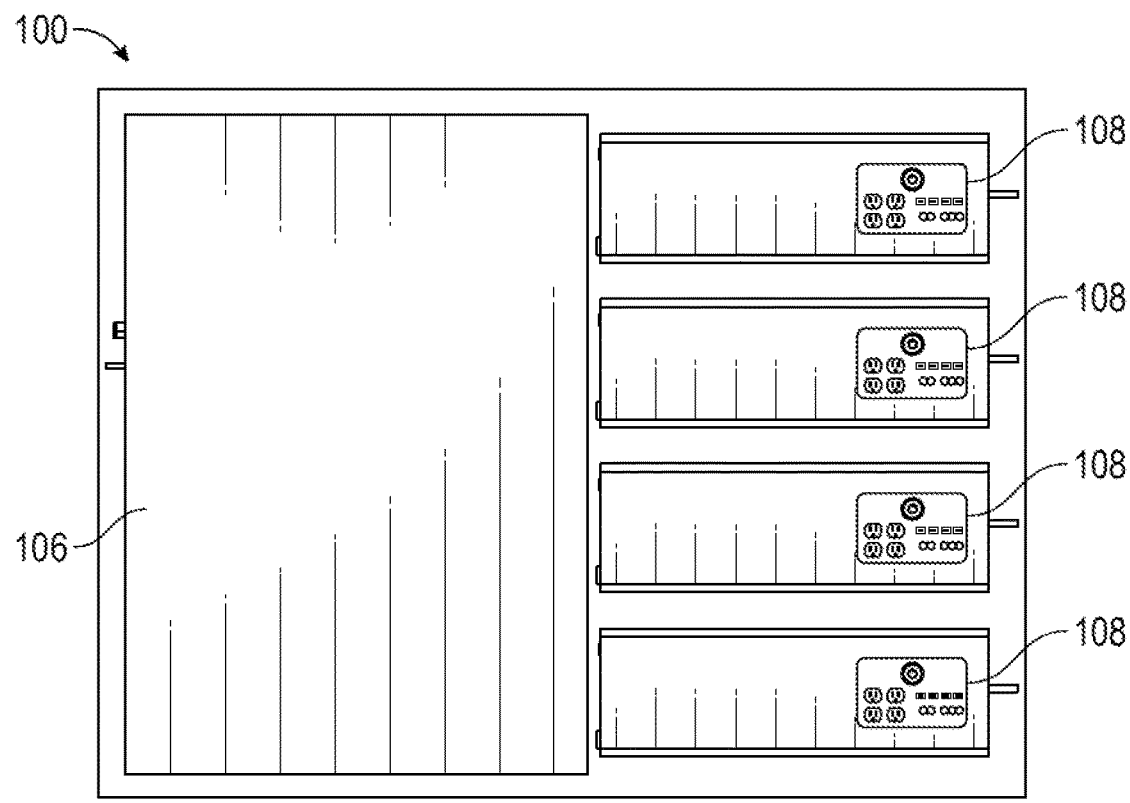
FIG. 8 illustrates a schematic view showing an example configuration of portable energy storage devices for the power management system of FIG. 1.

FIG. 8A illustrates a schematic view of an example orientation of the stationary energy storage device 106 and the portable energy storage devices 108. As shown in FIG. 5A, the portable energy storage device 108 may be stored or positioned near the top of the enclosure 500 of the stationary energy storage device 106 such that the portable energy storage device 108 is positioned above, for example the power processing device 110 and the battery 107. In some implementations, as shown in FIG. 8, the portable energy storage devices 108 may be positioned adjacent to the stationary energy storage device 106.

Figure 9A:
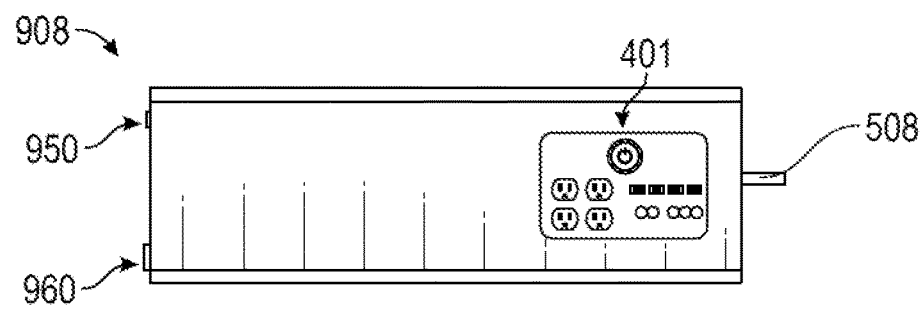
FIGS. 9A and 9B illustrate various views of another embodiment of a portable energy storage device of the power management system of FIG. 1.
Figure 9B:
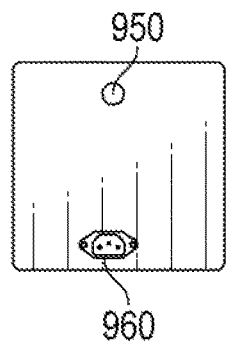

FIGS. 9A and 9B illustrate a portable energy storage device 908, which is an embodiment of the portable energy storage device 108. FIG. 8A illustrates a side of the portable storage device 908 and the FIG. 8B illustrates a review view of the portable storage device 908. The portable energy storage device 908 can have a quadrilateral (e.g., square) cross-section as shown in FIG. 8B. The portable energy storage device 908 can include the panel 401 and the handle 508. The panel 401, as described herein, can include a number of outputs such as AC output, USB plus-in, standard 12 VDC/5 A outputs, and the like. The panel 401 can include a power button and an indicator for showing a charge level for the portable energy storage device 908. The portable energy storage device 908 can include a light indicator 950 and a power input 960 on its rear side. The light indicator 950 can indicate status of the portable energy storage device 908 including, but not limited to, power on, power off, charge level, charge status (e.g., charging and charge complete), and the like. In some implementations, the light indicator 950 may be used as a flashlight. The power input 960 may be a DC power input or an AC power input for the portable energy storage device 908. The power received via the input 960 may be stored within the portable energy storage device 908 for future use.

In some implementations, the power management system 100 may be easy to install for household user and designed to provide power for different household appliances. It may be equipped with batteries with long-life, provide photovoltaic array access, and provide power for residential buildings, public facilities, small factories, etc.

In some implementations, the power management system 100 can have two different operation modes: off grid and with grid. The energy distribution system may provide seamless, automatic switching between the two operation modes, thereby greatly improving the reliability of power supply. The switching between the two operation modes may take less than 10 ms, which can ensure that the critical load is not powered off. With its flexible and efficient management system, the energy distribution system can adjust the operation strategy according to the grid, load, energy storage, and electricity price, so as to reduce energy costs and improve energy availability.

In some implementations, the power management system 100 can reduce household electricity use by drawing or receiving power from the energy source 20. As described herein, the power from received from the energy source 20 can be stored within the stationary energy storage unit 106 or the portable energy storage unit 108. In some implementations, the power management system 100 can prioritize the energy source 20 over the electrical grid 10. For example, when the energy source 20 is generating power, the power management system 100 can receive power from the energy source 20 to supply the power from the energy source 20 to the electrical load 30. If the power from the energy source 20 is insufficient for the electrical load 30, the power management system 100 can draw power from the electrical grid 10 to supplement the electrical load 30.

In some implementations, users, via the user computing devices 50, can monitor status (e.g., operation mode (such as charging or discharging), charge rate, discharge rate, battery performance, number of charge/discharge cycles, temperature, charge capacity, etc.) of the stationary energy storage device 106, the portable energy storage device(s) 108, and the energy sources 20 real-time.

In some implementations, the power management system 100 may use the energy source 20 to charge the stationary energy storage device 106. The power generated by the energy source 20 can be used (e.g., transmitted to the electrical load 30) immediately in the daytime. Any remaining power (e.g., power remaining after supplying energy to the electrical load 30) may be stored in the stationary energy storage device 106 or the portable energy storage device 108. In some implementations, at night, the power stored in the stationary energy storage device 106 or the portable energy storage device 108 (e.g., power stored in the daytime) may be used (e.g., supplied to the electrical load 30) first, and when the power stored in the stationary energy storage device 106 or the portable energy storage device 108 is insufficient, the off-peak electricity from the electrical grid 10 may be used. In some implementations, when the stored in the stationary energy storage device 106 or the portable energy storage device 108 is charged, the power management system 100 can use the power stored in the stored in the stationary energy storage device 106 or the portable energy storage device 108 to supply power for the electrical load 30 when the electrical grid 10 is unavailable.

The stationary energy storage device 106 of the power management system 100 may include one or more lithium iron phosphate batteries (48 V 210 Ah, 16S2P) (e.g., the battery 107), inverters (solar charging, 300-500 Vdc, 7-10 kW; municipal charging, 110 VAC/220 VAC, ±10%; municipal output 110 VAC/220 VAC, ±10%) (e.g., the power processing device 110), side design with LED light belt (the LED light flashes upward when charging, the LED light flashes downward when discharging, the light belt is divided into 10 grids, each grid represents about 10% of the capacitance) (e.g., the charge indicator 510), battery management system (real-time protection: including the settings of secondary overcurrent, short-circuit protection, hardware overvoltage, hardware undervoltage and other protection; NTC configuration; balanced configuration; capacity setting), and the network communication device 112. As described herein, the power processing device 110 can include one or more outputs (e.g., DC, AC) that can be used not only for supplying power for household electrical products and lighting, but also for charging portable mobile energy storage products.

In some implementations, the portable energy storage device 108 may include lithium iron phosphate battery (24V25Ah, 8S1P), an inverter (solar energy charging, 30 VDC, 500 W; mains charging, 110 VAC, ±10%; mains output, 110 VAC, ±10%), side design with LED light belt (the LED light flashes to the right when charging, the LED light flashes to the left when discharging, the light belt is divided into 10 grids, each grid represents about 10% of the capacitance), a battery management system (real-time protection: including settings of secondary overcurrent, short-circuit protection, hardware overvoltage, hardware undervoltage and other protections; NTC configuration; balanced configuration; capacity setting) as described herein. The portable energy storage device 108 can include one or more outputs (e.g., DC, AC) that can be used for providing power for consumer electrical products and lighting.

In some implementations, energy stored within the portable energy storage device 108 may be used to provide power to vehicles, for example, failing to start due to power loss or for other reasons. In some implementations, the portable energy storage device may be used outdoors as, for example, an emergency power supply, power source for outdoor lighting, and the like.

In some implementations, the portable energy storage device 108 may include a slide rail that can facilitate storage of the portable energy storage device 108 from the charging dock 114 of the power management system 100. When the portable energy storage device is removed from the charging dock 114, the slide rail can guide the portable energy storage device 108 and prevent it from falling during removal. In some implementations, the charging dock 114 can include a rail that corresponds to the slide rail of the portable energy storage device 108. The rail of the charging dock 114 and the slide rail of the portable energy storage device 108 can mate and provide improved stability and insertion/removal for the portable energy storage device 108.

In some implementations, the charging dock 114 can include a cover. When the portable energy storage device is removed from the charging dock 114, the cover can automatically cover an opening of the charging dock 114. The cover can advantageously prevent dust and small animals from entering the charging dock 114 and potentially damaging the connectors (e.g., the connectors 702 shown in FIG. 7A) inside the charging dock 114.

In some implementations, an enclosure for the power management system 100 (e.g., the enclosure 500 as shown in FIG. 5A) can include a display that can show graphical user interface. The display can be a touch screen. The display can allow users to interact gather information associated with the power management system 100 (e.g., energy cost saved, battery performance, power generated, and the like) and provide input (e.g., minimum/maximum charge level for the portable energy storage device 108 or the stationary energy storage device 106) for the power management system 100.

In some implementations, the portable energy storage device 108 can have at least 1 kWh of power storage capacity while the stationary energy storage device 106 can have at least 9 kWh of power storage capacity. Together, the portable energy storage device 108 and the stationary energy storage device 106 can have at least 10 kWh of power storage capacity.

The power management system 100 can have multiple charging modes and discharging modes. The power management system 100 can operate in a first charging operation when the portable energy storage device 108 is disconnected from the charging dock 114. In some implementations, the power management system 100 can operate in the first charging operation when the charge level (e.g., percentage charged compared to the maximum charge level) of the stationary energy storage device 106 is less than the charge level of the portable energy storage device 108 connected in the charging dock 114. In the first charging operation, the power management system 100 can draw power from the electrical grid 10 and/or from the energy source 20 to charge the stationary energy storage device 106. In some implementations, the power management system 100 can continue to charge the stationary energy storage device 106 until the charge level of the stationary energy storage device 106 satisfies (e.g., greater than or equal to) a threshold. The threshold may be predetermined by a manufacturer and later be modified by a user. Once the charge level of the stationary energy storage device 106 satisfies the threshold, the power management system can begin charging the portable energy storage device 108 if the portable energy storage device 108 is connected to the charging dock 114.

When in the first charging operation (or mode), the power management system 100 can prioritize charging of the stationary energy storage device 106 over charging of the portable energy storage device 108. For example, when the power management system 100 is in the first charging operation, a charge rate associated with the stationary energy storage device 106 can be greater than a charge rate associated with the portable energy storage device 108.

The power management system 100 can operate in a second charging operation when the portable energy storage device 108 is present in the charging dock 114 (e.g., coupled to and ready to be charged). In some implementations, the power management system 100 is in the second charging operation when the charge level (e.g., percentage charged compared to the maximum charge level) of the portable energy storage device 108 is less than the charge level of the stationary energy storage device 106. In some implementations, the charge stored in the stationary energy storage device 106 may be used to charge the portable energy storage device 108. As such, the charge level of the stationary energy storage device 106 may decrease while providing charge for the portable energy storage device 108. The power management system 100 may continue to charge the portable energy storage device 108 until the charge level of the portable energy storage device 108 satisfies (e.g., greater than or equal to) a threshold. Additionally or alternatively, the power management system 100 may continue to charge the portable energy storage device 108 until the charge level of the stationary energy storage device 106 satisfies (e.g., less than or equal to) a threshold. In some implementations, when the energy source 20 is available and generating power, the power management system 100 can charge the portable energy storage device 108 using both the charge from the stationary energy storage device 106 and the power from the energy source 20.

In some implementations, when in the second charging operation, the power management system 100 can draw power from the electrical grid 10 and direct it to the stationary energy storage device 106 while the charge stored in the stationary energy storage device 106 is used to charge the portable energy storage device 108. As such the charge level of the stationary energy storage device 106 may remain the same or increase while the portable energy storage device 108 is being charged (that is, with charge from the stationary energy storage device 106).

When in the second charging operation, the power management system 100 can prioritize charging the stationary energy storage device 106. The power management system 100 can charge the stationary energy storage device 106 first and then use power stored in the stationary energy storage device 106 to charge the portable energy storage device 108. In some implementations, both the stationary energy storage device 106 and the portable energy storage device 108 may be charged simultaneously. However, the power management system 100 can cause the charge level of the stationary energy storage device 106 to increase at a rate greater than that of the portable energy storage device 108. Alternatively, the charge levels of the stationary energy storage device 106 and the portable energy storage device 108 may increase at the same rate.

The power management system 100 can switch between the first charging operation and the second charging operation so that the charge levels of the stationary energy storage device 106 and the portable energy storage device 108 can later become the same or substantially the same (e.g., within 1% of each other, within 3% of each other, within 5% of each other, within 10% of each other, or within a certain amount of charge level—for example, 0.5 kWh—between each other).

In some implementations, when the energy source 20 is available and generating power, the power management system 100 can charge the stationary energy storage device 106 using both the power from the electrical grid 10 and the power from the energy source 20.

The power management system 100 can operate in a third charging operation when the portable energy storage device 108 is present in the charging dock (e.g., coupled to and ready to be charged) and the charge levels of the stationary energy storage device 106 and portable energy storage device 108 are equal. As used herein, charge levels of devices are considered "equal" when the charge levels are approximately equal (e.g., within 1% of each other, within 3% of each other, within 5% of each other, within 10% of each other, or within a certain amount of charge level—for example, 0.1 kWh, 0.2 kWh, or 0.5 kWh—between each other). In the third charging mode, the stationary energy storage device 106 and the portable energy storage device 108 may be charged at the same rate. As described herein, the charge (or power) stored in the stationary energy storage device 106 may be used to charge the portable energy storage device 108 and the power management system 100 can simultaneously draw power from the electrical grid 10 and charge the stationary energy storage device 106. In some implementations, when the energy source 20 is available and generating power, the power from the energy source 20 can be used to charge the portable energy storage device 108 or the stationary energy storage device 106.

The power management system 100 can operate in a first discharging operation during periods when the energy source 20 (e.g., photovoltaic cells) is unavailable and/or the electrical grid 10 is unavailable. In the first discharging mode, the stationary energy storage device 106 can provide power to the electrical load 30 (e.g., electrical devices in a residence). The power management system 100 can operate in the first discharging operation until the charge in the stationary energy storage device 106 is completely drained. In some implementations, the power management system 100 can operate in the first discharging operation until the charge in the stationary energy storage device 106 satisfies a threshold (e.g., the charge in the stationary energy storage device 106 is less than or equal to a threshold).

The power management system 100 can operate in a second discharging operation when both the energy source 20 and the electrical grid 10 are unavailable, when the stationary energy storage device 106 is substantially discharged, and when the portable energy storage device 108 is present in the charging dock 114 (e.g., coupled to the charging dock 114). In the second discharging mode, the power management system 100 can supply the power stored within the portable energy storage device 108 to the electrical load 30. In some implementations, the power stored within the portable energy storage device 108 can be directly supplied to the electrical load 30 by bypassing, for example, the power processing device 110 of the stationary energy storage device 106. In some implementations, the power from the portable energy storage device 108 can be transferred to the battery 107 of the stationary energy storage device 106 and subsequently supplied to the electrical load 30. The power management system 100 can operate in the second discharging operation until the charge in the portable energy storage device 108 is completely drained. In some implementations, the power management system 100 can operate in the second discharging operation until the charge in the portable energy storage device 108 satisfies a threshold (e.g., the charge in the portable energy storage device 108 is less than or equal to a threshold).

Different charge level thresholds may be used for the stationary energy storage device 106 and the portable energy storage device 108 in when in different charging modes and discharging modes. The charge level thresholds can be the amount of charge stored or the percentage indicating a charge ratio (e.g., ratio between available charge of the portable energy storage device 108 compared to the maximum charge level). The threshold for the portable energy storage device 108 may be between 0-1 kWh. The threshold for the stationary energy storage device 106 may be between 0-10 kWh.

The power management system 100 can operate in any of the charging modes and the discharging modes. Based on at least one of availability of the electrical grid 10 (e.g., whether the power management system 100 is able to connect to and draw power from the electrical source 10), availability of the energy source 20 (e.g., whether the power management system 100 is able to connect to and draw power from the electrical source 20), charge levels associated with the stationary energy storage device 106 and the portable energy storage device 108, comparisons between charge levels associated with the stationary energy storage device 106 and the portable energy storage device 108, availability of the portable energy storage device 108 (e.g., whether it is connected to the charging dock 114)

Figure 10:
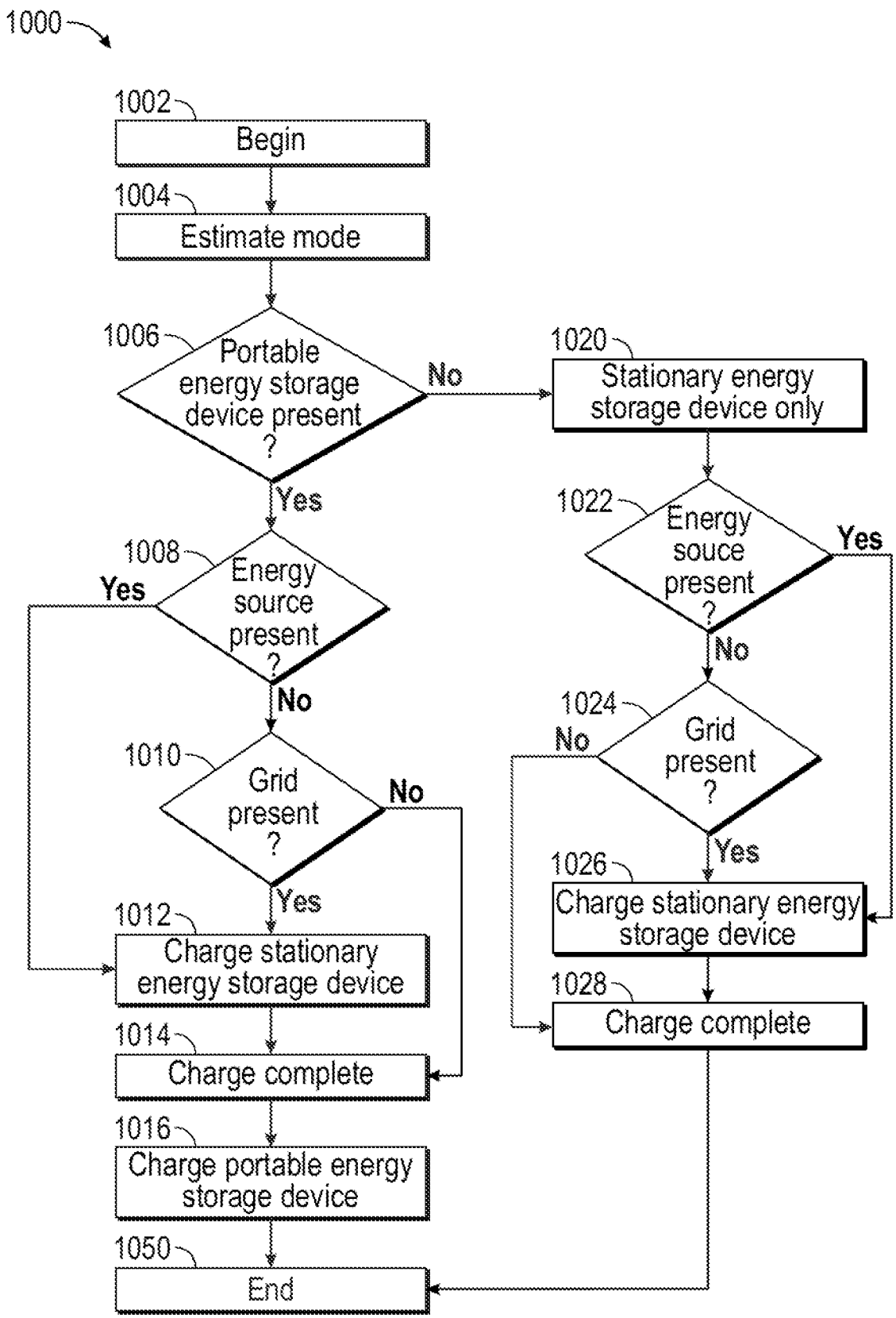
FIG. 10 illustrates a flow chart of an embodiment of a method of providing power for a stationary energy storage device and a portable energy storage device.

FIG. 10 illustrates a flow chart of an embodiment of a process 1000 of charging the portable energy storage device 108 and the stationary energy storage device 106. The process 1000 can be performed by the power management system 100. The process 1000 begins at block 1002. At block 1004, the power management system 100 can determine an operating mode. The operating mode can include various charging modes and discharging modes described herein. The determination of the operating mode can be made based on the presence/absence of the portable energy storage device 108, charge level of the portable energy storage device 108, and charge level of the stationary energy storage device 106. Once an operation mode is determined, it can be subsequently changed based on presence/absence of the portable energy storage device 108, charge level of the portable energy storage device 108, and charge level of the stationary energy storage device 106.

At block 1006, the power management system 100 determines whether the portable energy storage device 108 is present (e.g., connected to the charging dock 114 and able to receive power from the stationary energy storage device 106). If the portable energy storage device 108 is present, the process 1000 proceeds to block 1008. If the portable energy storage device 108 is not present, the process 1000 proceeds to block 1020.

At block 1008, the power management system 100 determines whether the energy source 20 is present (e.g., whether the power processing device 110 of the stationary energy storage device 106 is connected to the electrical source 20 and able to draw power from the electrical source 20). If the energy source 20 is not present, the process 1000 proceeds to block 1010. If the energy source 20 is present, the process 1000 proceeds to block 1012.

At block 1010, the power management system 100 determines whether the electrical grid 10 is present (e.g., whether the power processing device 100 of the stationary energy storage device 106 is connected to the electrical grid 10 and able to draw power from the electrical grid 10). If the electrical grid 10 is present, the process 1000 proceeds to block 1012. If the electrical grid 10 is not present, the process 1000 proceeds to block 1050 where the process 1000 is comes to an end.

At block 1012, the power management system 100 charges the stationary energy storage device 106. If the stationary energy storage device 106 is fully charged or when the charge level (e.g., amount or percentage of charge stored in the stationary energy storage device 106) satisfies a threshold, the power management system 100 may not charge the stationary energy storage 106. At block 1014, the power management system 100 determines that the charging of the stationary energy storage device 106 is complete. In some implementations, as described herein, the charging of the stationary energy storage device 106 may be complete when the stationary energy storage device 106 is fully charged (e.g., cannot store any more power). In some implementations, as described herein, the charging may be complete when the charge level (e.g., amount or percentage of charge stored in the stationary energy storage device 106) satisfies a threshold.

At block 1016, the power management system 100 charges the portable energy storage device 108. The portable energy storage device 108 may be charged using the power stored in the stationary energy storage device 106 (e.g., the battery 107). In some implementations, the portable energy storage device 108 may be charged using the power drawn from the electrical grid 10 via the power processing device 110 and supplied (e.g., by the power processing device 110) directly to the portable energy storage device 108. In some implementations, block 1016 can occur simultaneously with block 1012. In other words, the charging of the stationary energy storage device 106 and the portable energy storage device 108 may occur simultaneously before charging of the stationary energy storage device 106 is complete.

Depending on the charge level of the stationary energy storage device 106, the process 1000 may bypass blocks 1012, 1014. For example, if the stationary energy storage device 106 is fully charged or the charge level of the stationary energy storage device 106 satisfies a threshold, the power management system 100 may charge the portable energy storage device 108 without charging the stationary energy storage device 106.

At block 1020, the power management system 100 determines that only the stationary energy storage device 106 is present. At block 1022, the power management system 100 determines whether the energy source 20 is present (e.g., whether the power processing device 110 of the stationary energy storage device 106 is connected to the electrical source 20 and able to draw power from the electrical source 20). If the energy source 20 is not present, the process 1000 proceeds to block 1024. If the energy source 20 is present, the process 1000 proceeds to block 1026.

At block 1024, the power management system 100 determines whether the electrical grid 10 is present (e.g., whether the power processing device 100 of the stationary energy storage device 106 is connected to the electrical grid 10 and able to draw power from the electrical grid 10). If the electrical grid 10 is present, the process 1000 proceeds to block 1026. If the electrical grid 10 is not present, the process 1000 proceeds to block 1050 where the process 1000 is comes to an end.

At block 1026, the power management system 100 charges the stationary energy storage device 106. If the stationary energy storage device 106 is fully charged or when the charge level (e.g., amount or percentage of charge stored in the stationary energy storage device 106) satisfies a threshold, the power management system 100 may not charge the stationary energy storage 106. At block 1028, the power management system 100 determines that the charging of the stationary energy storage device 106 is complete. As described herein, the charging of the stationary energy storage device 106 may be complete when the stationary energy storage device 106 is fully charged (e.g., cannot store any more power) or when the charge level (e.g., amount or percentage of charge stored in the stationary energy storage device 106) satisfies a threshold.

Figure 11:
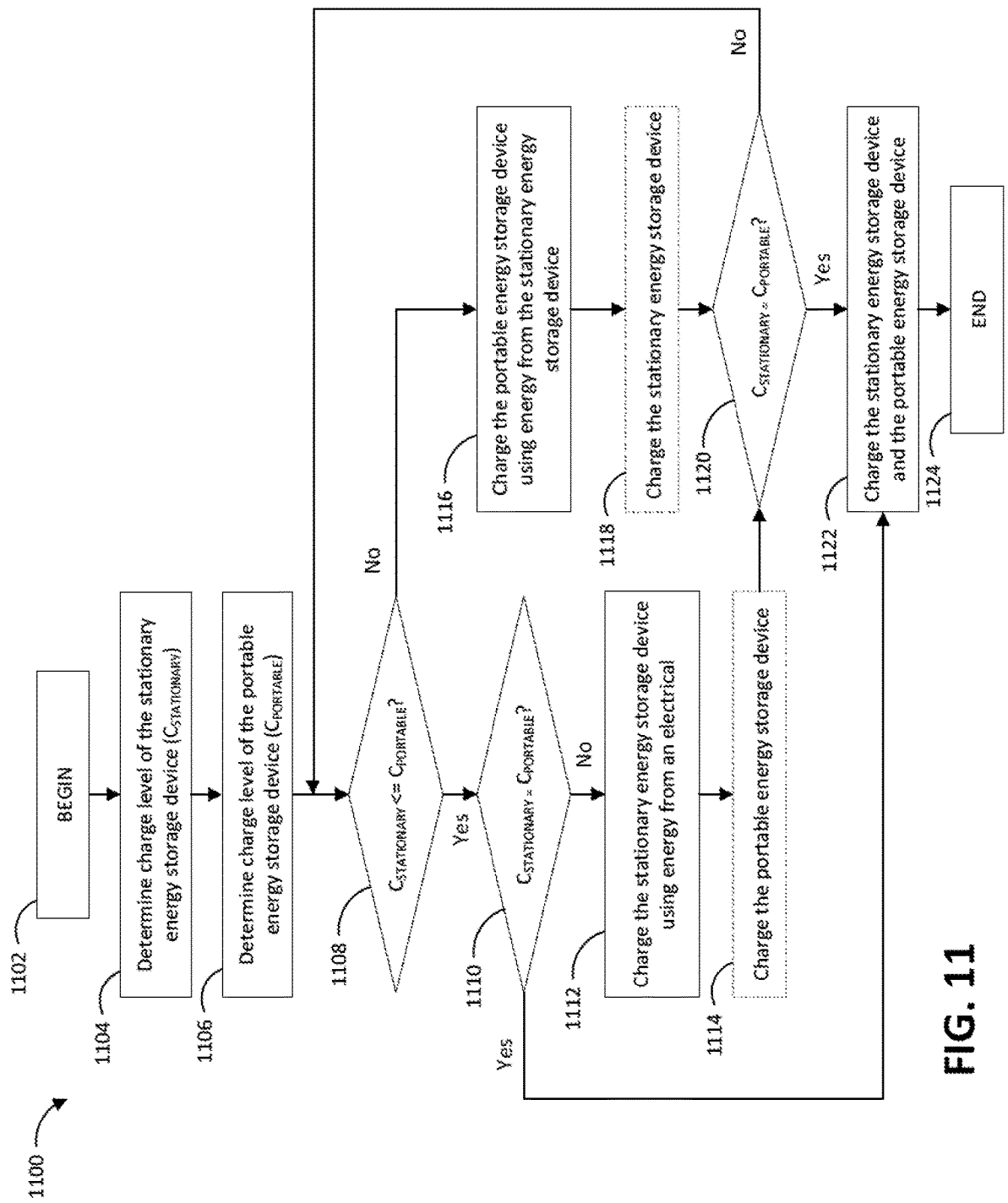
FIG. 11 illustrates a flow chart of an embodiment of a method of providing power for a stationary energy storage device and a portable energy storage device based on charge statuses associated with the stationary energy storage device and the portable energy storage device.

FIG. 11 illustrates an example process 1100 of the power management system 100 (e.g., for example, using the power processing device 110 of the stationary energy storage device 106) for providing power to (e.g., charging) the stationary energy storage device 106 and the portable energy storage device 108. The process 1100 can begin at block 1102. At block 1104, the power management system 100 can determine charge level or charge status (e.g., 50% full) of the stationary energy storage device 106. At block 1106, the power management system 100 can determine charge level or charge status of the portable energy storage device 108. It is contemplated that block 1106 can occur before block 1104 or simultaneously with block 1104.

At block 1108, the power management system 100 can determine whether the charge level or charge status of the stationary energy storage device 106 is less than the charge level or charge status of the portable energy storage device 108. If the charge level or charge status of the stationary energy storage device 106 is less than or equal to the charge level or charge status of the portable energy storage device 108, the process 1100 proceeds to block 1110. If the charge level or charge status of the stationary energy storage device 106 is not less than or equal to the charge level or charge status of the portable energy storage device 108 (that is, the charge level or charge status of the stationary energy storage device 106 is greater than that of the portable energy storage device 108), then the process 1100 can proceed to block 1116.

At block 1110, the power management system 100 can determine whether the charge level or charge status of the stationary energy storage device 106 is equal to the charge level or charge status of the portable energy storage device 108. If the charge levels or charge statuses of the stationary energy storage device 106 and the portable energy storage device 108 are the same, then the process 1100 can proceed to block 1122. If the charge levels or charge statuses of the stationary energy storage device 106 and the portable energy storage device 108 are not the same, then the process 1100 can proceed to block 1112.

Block 1112 can be associated with a first charging operation (or charging mode) of the power management system 100. At block 1112 (e.g., during the first charging operation), the power management system 100 can charge the stationary energy storage device 106 using power drawn from the electrical grid 10. In some implementations, if the energy source 20 is available and generating power, the power management system 100 can use power generated by the energy source 20 to charge the stationary energy storage device 106. The power management system 100 can prioritize the energy source 20 over the electrical grid 10 so that when both are available, the power management system 100 uses the power generated by the energy source 20 to charge the stationary energy storage device 106 instead of the power drawn from the electrical grid 10.

At block 1114, the power management system 100 can charge the portable energy storage device 108. In some implementations, power stored in the stationary energy storage device 106 can be used to charge the portable energy storage device 108. As such, block 1114 and block 1112 can occur at the same time. In some implementations, block 1114 may be optional. For example, if the charge level or charge status of the portable energy storage device 108 satisfies a threshold (e.g., the charge level of the portable energy storage device 108 is greater than 90%), then the power management system 100 may not charge the portable energy storage device 108.

Block 1116 can be associated with a second charging operation (or charging mode) of the power management system 100. At block 1116 (e.g., during the second charging operation), the power management system 100 can charge the portable energy storage device 108 using power stored in the stationary energy storage device 106. At block 1118, the power management system 100 can charge (e.g., increase the charge level) the stationary energy storage device 106. In some implementations, block 1118 may be optional. For example, if the charge level or charge status of the stationary energy storage device 106 satisfies a threshold (e.g., the charge level of the stationary energy storage device 106 is greater than 80%), then the power management system 100 may not charge the stationary energy storage device 106.

At block 1120, the power management system 100 can determine whether the charge levels or charge statuses of the stationary energy storage device 106 and the portable energy storage device 108 are equal. In some implementations, the power management system 100 can determine whether the charge levels or charge statuses of the stationary energy storage device 106 and the portable energy storage device 108 are substantially equal (e.g., within 1% of each other, within 3% of each other, within 5% of each other, within 10% of each other, or within a certain amount of charge level—for example, 0.5 kWh—between each other). If the charge levels are equal, the process 1100 proceeds to block 1122. If the charge levels are not equal, the process 1100 proceeds to block 1108.

Block 1122 can be associated with a third charging operation (or charging mode) of the power management system 100. At block 1122 (e.g., during the third charging operation), the power management system 100 can charge the stationary energy storage device 106 and the portable energy storage device 108. In some implementations, the charging of the stationary energy storage device 106 and the portable energy storage device 108 can occur simultaneously. In some implementations, the stationary energy storage device 106 and the portable energy storage device 108 may be charged at the same rate so that their charge levels or charge statuses remain the same while being charged. At block 1124, the process 1100 ends.

Figure 12:
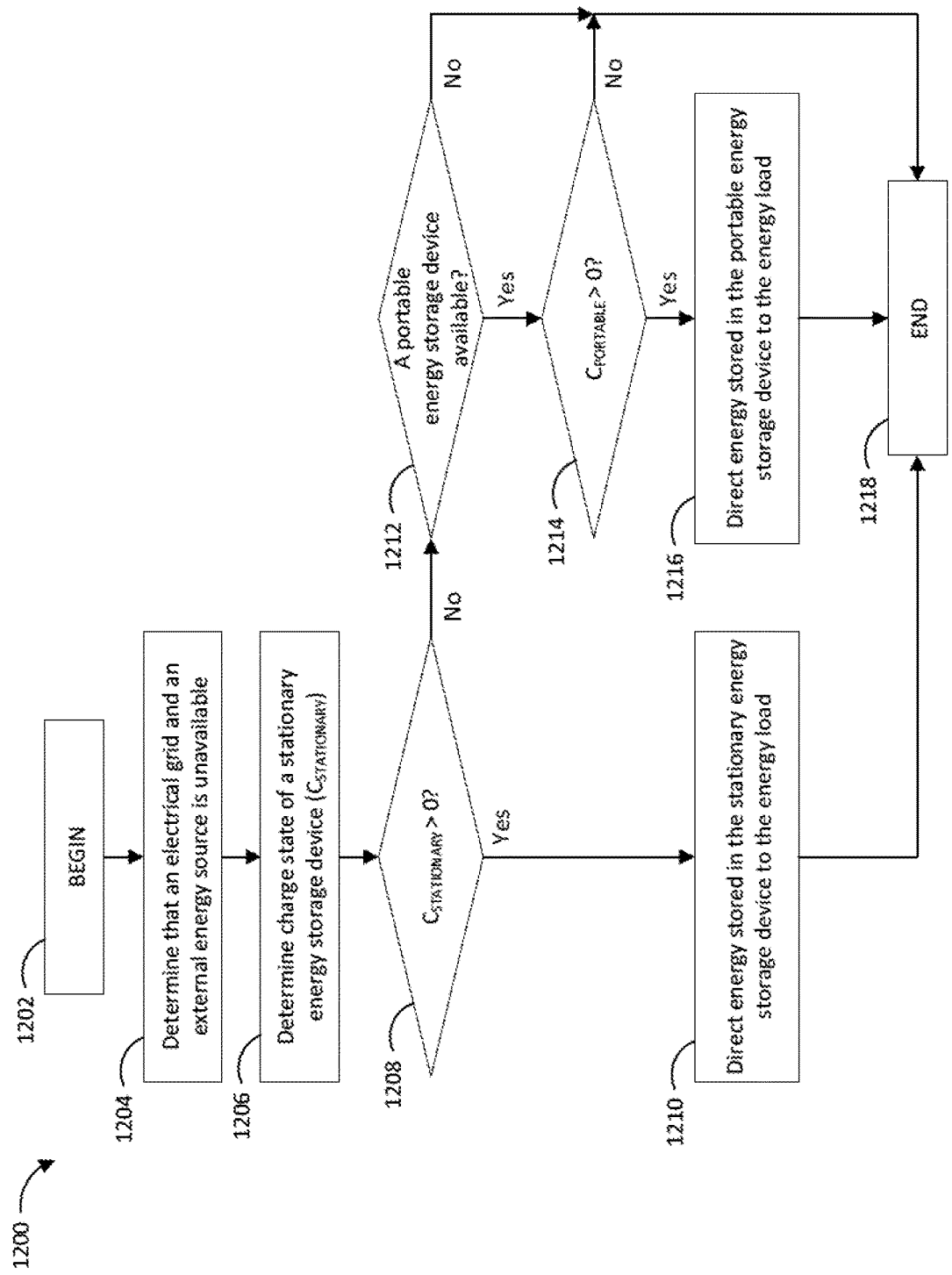
FIG. 12 illustrates a flow chart of an embodiment of a method of directing power stored in a stationary energy storage device and a portable energy storage device to an electrical load based on charge statuses associated with the stationary energy storage device and the portable energy storage device.

FIG. 12 illustrates an example process 1200 of the power management system 100 (e.g., for example, using the power processing device 110 of the stationary energy storage device 106) for using power of the stationary energy storage device 106 and the portable energy storage device 108 (e.g., discharging). The process 1200 can begin at block 1202. At block 1204, the power management system 100 determines that both the electrical grid 10 and the energy source 20 are unavailable. At block 1206, the power management system 100 determines the charge level or the charge state of the stationary energy storage device 106.

At block 1208, the power management system 100 can determine whether the charge level or the charge state of the stationary energy storage device 106 is greater than zero. In other words, the power management system 100 determines whether the stationary energy storage device 106 holds any charge (e.g., electrical power). If the charge level or the charge state of the stationary energy storage device 106 is greater than zero, then the process 1200 proceeds to block 1210. If the charge level or the charge state of the stationary energy storage device 106 is not greater than zero, then the process 1200 proceeds to block 1212.

Block 1210 can be associated with a first discharging operation (or discharging mode) of the power management system 100. At block 1210, the power management system 100 can direct energy storage in the stationary energy storage device 106 to the electrical load 30. The first discharging operation can continue until the stationary energy storage device 106 no longer holds charge (e.g., electrical power). In some implementations, the first discharging operation can continue until the charging level or the charging status of the stationary energy storage device 106 satisfies a threshold (e.g., stop discharging if the charge level of the stationary energy storage device 106 is less than 10%).

At block 1212, the power management system 100 determines whether the portable energy storage device 108 is available (e.g., connected to the charging dock 114 of the stationary energy storage device 106). If the portable energy storage device 108 is available, then the process 1200 proceeds to block 1214. If the portable energy storage device 108 is unavailable, then the process 1200 proceeds to block 1218.

At block 1214, the power management system 100 can determine whether the charge level or the charge state of the portable energy storage device 108 is greater than zero. In other words, the power management system 100 determines whether the portable energy storage device 108 holds any charge (e.g., electrical power). If the charge level or the charge state of the portable energy storage device 108 is greater than zero, then the process 1200 proceeds to block 1216. If the charge level or the charge state of the stationary energy storage device 106 is not greater than zero, then the process 1200 proceeds to block 1218.

Block 1216 can be associated with a second discharging operation (or discharging mode) of the power management system 100. At block 1216, the power management system 100 can direct energy storage in the portable energy storage device 108 to the electrical load 30. The second discharging operation can continue until the portable energy storage device 108 no longer holds charge (e.g., electrical power). In some implementations, the second discharging operation can continue until the charging level or the charging status of the portable energy storage device 108 satisfies a threshold (e.g., stop discharging if the charge level of the portable energy storage device 108 is less than 10%). At block 1218, the process 1200 ends.

In some implementations, the connection between the power processing device 110 and the portable energy storage device 108 can include four conductors: two grounds, a positive electrode, and a negative electrode. The use of 2 ground conductors increases the safety and reliability of the power processing device 110 and portable energy storage device 108. Likewise, the connection between the power processing device 110 and the stationary energy storage device 106 can also include four conductors: two grounds, a positive electrode, and a negative electrode.

In some implementations, the power management system 100 can include a liquid cooling circuit that regulates the temperature of, for example, the stationary energy storage device 106 or the portable energy storage device 108. Additionally and/or alternatively, the portable energy storage device 108 can be passively cooled by thermal conduction between battery cells (e.g., the battery 300) to the casing of the portable energy storage device 108. The casing of the portable energy storage device 108 and other thermal management components can include or be made out of materials with high thermal conductivity (e.g., steel, aluminum, and the like) that provide excellent passive thermal management of the battery (e.g., the battery 300) of the portable energy storage device 108. In some implementations, the casing of the portable energy storage device 108 can incorporate graphene or other high-conductivity materials that can be layered over the steel casing to improve thermal management of the portable energy storage device 108.

The portable energy storage device 108 can weigh no more than 25-30 pounds while including at least 1 kWh of electric storage capacity. The portable energy storage device 108 may include one or more 110 V electric outlets and one or more USB charging ports. In some implementations, the portable energy storage device 108 can provide sufficient current and voltage to jump start a vehicle with a drained battery. The portable energy storage device 108 can include a built-in flashlight and lantern. Additionally, the portable energy storage device 108 can include a power cord that permits the portable power module to recharge via a standard electrical outlet.

The user computing device 50 can cause the power management system 100 to indicate scheduled times when the power management system 100 charges, for example, the stationary energy storage devices and the portable energy storage devices (e.g., during daytime hours) and when the storage device discharges, for example, the stationary energy storage devices and the portable energy storage devices (e.g., at night). The energy storage distribution system 100 can be programmed with different minimum charge levels for the stationary energy storage devices or the portable energy storage devices in various situations including, but not limited to, (1) when power is available from the electrical grid, (2) when the energy source 20 is available and generating power, (3) when the electrical grid 10 is unavailable (that is, when the power management system 100 is off-grid), and (4) when the energy source 20 is unavailable (that is, not generating power). Once the minimum charge level is reached for a given condition, the discharging modes may be unavailable. In other words, once the charge level of, for example, the stationary energy storage device 106, is below a certain threshold level, the power management system 100 may not be able to direct the power from the stationary energy storage device 106 to the portable energy storage device 108 or the electrical load 30 (for example, light fixtures).

In some implementations, the power management system 100 may include a dock for receiving and a removable, portable, rechargeable, self-contained electric storage device 108. Once the portable energy storage device 108 is fully inserted with the dock of the power management system 100, the portable energy storage device 108 can, for example, receive power from the power management system 100. The stationary energy storage device 106 of the power management system 100 can have substantially more energy storage capacity than the portable energy storage device 108 such that it (that is, the stationary energy storage device 106) can charge the portable energy storage device 108 even when the power management system 100 is not connected to the grid (that is, off-grid) or when the electrical grid is unavailable.

In some implementations, the stationary energy storage device 106 can have at least 9 kWh of electric storage capacity. The stationary device may be connected to multiple external power supplies, such as the electrical main and a solar power source. The stationary device may include an active temperature control system with a liquid coolant circuit. The portable device weighs no more than 30 pounds and includes at least 1 kWh of electric storage capacity. The portable energy storage device 108 may include a built-in flashlight and/or lantern. When a locking mechanism is in a locked position, the portable energy storage device 108 may be secured to the charging dock 114 of the stationary energy storage device 106 and can receive power from the stationary energy storage device 106. When the locking mechanism is in an unlocked position, the portable energy storage device 108 may be disconnected from the charging dock 114 and cannot receive power from the stationary energy storage device 106.

Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the systems, devices or methods illustrated can be made without departing from the spirit of the disclosure. As will be recognized, certain embodiments described herein can be embodied within a form that does not provide all of the features and benefits set forth herein, as some features can be used or practiced separately from others.

The term "and/or" herein has its broadest, least limiting meaning which is the disclosure includes A alone, B alone, both A and B together, or A or B alternatively, but does not require both A and B or require one of A or one of B. As used herein, the phrase "at least one of" A, B, "and" C should be construed to mean a logical A or B or C, using a non-exclusive logical or.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the foregoing disclosure has been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. Accordingly, the present invention is not intended to be limited by the description of the preferred embodiments, but is to be defined by reference to claims.

What is claimed is:

1. A building power storage and management system comprising:
    a power processing device comprising:
        a first electrical interface configured to connect to an electrical grid;
        a second electrical interface configured to connect to an external energy source;
        a third electrical interface configured to connect to an electrical load of a building; and
        a fourth electrical interface connected to a charging dock configured to electrically connect to a portable energy storage device;
    a stationary energy storage device configured to store at least 5 kWh of electric energy, wherein the stationary energy storage device comprises the charging dock, wherein the portable energy storage device is configured to store at least 1 kWh of electric energy;
    a non-transitory memory configured to store specific computer-executable instructions; and
    an electronic processor in communication with the non-transitory memory and configured to execute the specific computer-executable instructions to at least:
        determine that the stationary energy storage device has an equal or lower charge state than the portable energy storage device during a first charging period;
        in response to determining that the stationary energy storage device has the equal or lower charge state than the portable energy storage device during the first charging period, cause the power processing device to charge the stationary energy storage device in a first charging operation by directing electric energy from the external energy source or from the electrical grid to the stationary energy storage device;

determine that the stationary energy storage device has a higher charge state than the portable energy storage device during a second charging period; and in response to determining that the stationary energy storage device has the higher charge state than the portable energy storage device during the second charging period, cause the power processing device to charge the portable energy storage device in a second charging operation by directing electric energy from the stationary energy storage device to the portable energy storage device;

wherein the second charging period is after the first charging period based on a charge level of the stationary energy storage device being less than a threshold.

2. The system of claim 1, wherein the electronic processor is further configured to execute the specific computer-executable instructions to at least:

determine that the stationary energy storage device and the portable energy storage device have an equal charge state during the first charging period; and in response to determining that the stationary energy storage device and the portable energy storage device have the equal charge state during the first charging period, cause the power processing device to charge the portable energy storage device in a third charging operation by directing electric energy from the stationary energy storage device to the portable energy storage device simultaneously or intermittently with the first charging operation.

3. The system of claim 1, wherein the electronic processor is further configured to execute the specific computer-executable instructions to at least:

determine that electric energy from the external energy source and from the electrical grid is unavailable and that the stationary energy storage device stores electric energy during a first discharging period; and in response to determining that electric energy from the external energy source and from the electrical grid is unavailable and that the stationary energy storage device stores electric energy during the first discharging period, cause the power processing device to discharge the stationary energy storage device in a first discharging operation by directing electric energy from the stationary energy storage device to the electrical load of the building.

4. The system of claim 1, wherein the electronic processor is further configured to execute the specific computer-executable instructions to at least:

determine that electric energy from the external energy source, from the electrical grid, and from the stationary energy storage device is unavailable and that the portable energy storage device stores electric energy during a second discharging period; and in response to determining that electric energy from the external energy source, from the electrical grid, and from the stationary energy storage device is unavailable and that the portable energy storage device stores electric energy during the second discharging period, cause the power processing device to discharge the portable energy storage device in a second discharging operation by directing electric energy from the portable energy storage device to the electrical load of the building.

5. The system of claim 1, wherein the electronic processor is configured to cause the power processing device to switch between different charging modes and discharging modes based at least in part on the charge level of the stationary energy storage device and a charge level of the portable energy storage device.

6. The system of claim 1, wherein:

the portable energy storage device comprises a locking mechanism configured to secure the portable energy storage device within the charging dock of the stationary energy storage device;

when the locking mechanism is in an unlocked position, the portable energy storage device is configured to be disconnected from the stationary energy storage device such that the portable energy storage device does not receive power from the stationary energy storage device; and when the locking mechanism is in a locked position, the portable energy storage device is configured to be connected to the stationary energy storage device such that the portable energy storage device receives power from the stationary energy storage device.

7. The system of claim 6, wherein:

the portable energy storage device comprises a charge indicator configured to indicate the charge level of the portable energy storage device; and the charge indicator is configured to:
 turn off when the locking mechanism is in an unlocked position; and
 turn on when the locking mechanism is in a locked position.

8. The system of claim 6, wherein:

the locking mechanism comprises pins configured to move between an unactuated position and an actuated position; based at least in part on a position of a handle of the portable energy storage device;

the pins in the unactuated position are configured to be retracted and allow the portable energy storage device to be inserted into or removed from the charging dock; and the pins in the actuated position are configured to extend outward and away from a body of the portable energy storage device and prevent the portable energy storage device from being removed from the charging dock.

9. The system of claim 1, wherein, in the first charging operation, the power processing device charges the portable energy storage device, wherein a charge rate associated with the stationary energy storage device is greater than a charge rate associated with the portable energy storage device.

10. The system of claim 1, wherein, in the second charging operation, the power processing device charges the stationary energy storage device, wherein a charge rate associated with the stationary energy storage device is slower than a charge rate associated with the portable energy storage device.

11. The system of claim 1, wherein the stationary energy storage device has at least 10 kWh of electric storage capacity.

12. The system of claim 1, wherein the portable energy storage device has at least 0.5 kWh and no more than 2 kWh of electric storage capacity.

13. The system of claim 1, wherein the stationary energy storage device comprises an active temperature control system with a liquid coolant circuit.

14. The system of claim 1, wherein the stationary energy storage device has at least five times more capacity than the portable energy storage device, and wherein the stationary energy storage device can charge the portable energy storage device even when the stationary energy storage device is not connected to a power grid.

15. The system of claim 1, wherein the power drawn from the portable energy storage device is transferred to and stored in the stationary energy storage device prior to being supplied to the electrical load.

16. The system of claim 1, wherein the power from the portable energy storage device is directly transferred to the electrical load bypassing the stationary energy storage device.

17. The system of claim 1, wherein the portable energy storage device is within the charging dock of the stationary energy storage device, the portable energy storage device is configured to be removable from the charging dock.

18. The system of claim 1, wherein the threshold is predetermined by the manufacturer or modified by a user.

19. The system of claim 1, wherein in the second charging period, the electronic processor is configured to execute the specific computer-executable instructions to at least cause the power processing device to charge the portable energy storage device by both directing electric energy from the stationary energy storage device to the portable energy storage device and directing electric energy from the external energy source to the portable energy storage device.

20. The system of claim 1, wherein in the second charging period, the electronic processor is configured to execute the specific computer-executable instructions to at least cause the power processing device to direct electric energy from the electrical grid or the external energy source to the stationary energy storage device with electric energy being directed from the stationary energy storage device to the portable energy storage device.

21. The system of claim 20, wherein in the second charging period, a charge level of the stationary energy storage device remains the same or increases with electric energy being directed from the electrical grid or the external energy source to the stationary energy storage device and electric energy being directed from the stationary energy storage device to the portable energy storage device.

22. The system of claim 20, wherein in the second charging period, the electronic processor is configured to execute the specific computer-executable instructions to at least cause the power processing device to increase a charge level of the portable energy storage device at a rate higher than the charge level of the stationary energy storage device is being increased.

23. The system of claim 1, wherein the threshold is the stationary energy storage device being fully charged.

24. A method of managing power storage and distribution for a building, the method comprising:
by an electronic processor of a power storage and management system:
determining that a stationary energy storage device has an equal or lower charge state than a portable energy storage device during a first charging period;
in response to determining that the stationary energy storage device has the equal or lower charge state than the portable energy storage device during the first charging period, causing a power processing device to charge the stationary energy storage device in a first charging operation by directing electric energy from an external energy source or from an electrical grid to the stationary energy storage device;
determining that the stationary energy storage device has a higher charge state than the portable energy storage device during a second charging period; and
in response to determining that the stationary energy storage device has the higher charge state than the portable energy storage device during the second charging period, causing the power processing device to charge the portable energy storage device in a second charging operation by directing electric energy from the stationary energy storage device to the portable energy storage device;
wherein the second charging period is after first charging period based on a charge level of the stationary energy storage device being less than a threshold.

25. The method of claim 24 further comprising:
determining that the stationary energy storage device and the portable energy storage device have an equal charge state during the first charging period; and
in response to determining that the stationary energy storage device and the portable energy storage device have the equal charge state during the first charging period, causing the power processing device to charge the portable energy storage device in a third charging operation by directing electric energy from the stationary energy storage device to the portable energy storage device simultaneously or intermittently with the first charging operation.

26. The method of claim 24 further comprising:
determining that electric energy from the external energy source and from the electrical grid is unavailable and that the stationary energy storage device stores electric energy during a first discharging period; and
in response to determining that electric energy from the external energy source and from the electrical grid is unavailable and that the stationary energy storage device stores electric energy during the first discharging period, causing the power processing device to discharge the stationary energy storage device in a first discharging operation by directing electric energy from the stationary energy storage device to an electrical load of the building.

27. The method of claim 24 further comprising:
determining that electric energy from the external energy source, from the electrical grid, and from the stationary energy storage device is unavailable and that the portable energy storage device stores electric energy during a second discharging period; and
in response to determining that electric energy from the external energy source, from the electrical grid, and from the stationary energy storage device is unavailable and that the portable energy storage device stores electric energy during the second discharging period, causing the power processing device to discharge the portable energy storage device in a second discharging operation by directing electric energy from the portable energy storage device to an electrical load of the building.

* * * * *

UNITED STATES PATENT AND TRADEMARK OFFICE
CERTIFICATE OF CORRECTION

PATENT NO. : 11,791,630 B1
APPLICATION NO. : 17/306788
DATED : October 17, 2023
INVENTOR(S) : Cruess et al.

It is certified that error appears in the above-identified patent and that said Letters Patent is hereby corrected as shown below:

In the Claims

Column 29, Line 17, Claim 1, delete "device;" and insert -- device, --.

Column 32, Line 16, Claim 24, delete "device;" and insert -- device, --.

Signed and Sealed this
Second Day of January, 2024

Katherine Kelly Vidal
*Director of the United States Patent and Trademark Office*